United States Patent
Trader et al.

(10) Patent No.: US 12,449,422 B2
(45) Date of Patent: Oct. 21, 2025

(54) METHOD AND COMPOSITION MATTER FOR IMMUNOPROTEASOME-MEDIATED DELIVERY INTO LIVING CELLS

(71) Applicant: Purdue Research Foundation, West Lafayette, IN (US)

(72) Inventors: Darci J. Trader, West Lafayette, IN (US); Breanna Zerfas, Reading, MA (US)

(73) Assignee: Purdue Research Foundation, West Lafayette, IN (US)

( * ) Notice: Subject to any disclaimer, the term of this patent is extended or adjusted under 35 U.S.C. 154(b) by 944 days.

(21) Appl. No.: 17/428,676

(22) PCT Filed: Jan. 29, 2020

(86) PCT No.: PCT/US2020/015540
§ 371 (c)(1),
(2) Date: Aug. 5, 2021

(87) PCT Pub. No.: WO2020/163126
PCT Pub. Date: Aug. 13, 2020

(65) Prior Publication Data
US 2022/0120756 A1    Apr. 21, 2022

Related U.S. Application Data

(60) Provisional application No. 62/801,640, filed on Feb. 5, 2019.

(51) Int. Cl.
*G01N 33/58* (2006.01)
*A61K 39/00* (2006.01)
*C07K 5/11* (2006.01)

(52) U.S. Cl.
CPC ........ *G01N 33/582* (2013.01); *A61K 39/0011* (2013.01); *C07K 5/1019* (2013.01)

(58) Field of Classification Search
CPC . G01N 33/582; C07K 5/1019; A61K 39/0011
See application file for complete search history.

(56) References Cited

PUBLICATIONS

Ross et al., Cargo Transport: Molecular Motors Navigate a Complex Cytoskeleton, 2008, Current Opinion in Cell Biology, 20(1): 41-47 (Year: 2008).*
Lee et al. Delivery of macromolecules into live cells by simple coincubation with a peptide, 2010, Chembiochem, 11(3): 325-330) (Year: 2010).*
Sadelain et al., Cancer Discovery, 2013, pp. 388-398 (Year: 2013).*

* cited by examiner

*Primary Examiner* — Lianko G Garyu
*Assistant Examiner* — Claudia Espinosa
(74) *Attorney, Agent, or Firm* — Purdue Research Foundation

(57) ABSTRACT

The present invention generally relates to methods and composition matters for delivery of a cargo to a living cell over producing immunoproteasomes. More specifically the invention disclosed is a molecular construct that delivers a cargo, for diagnostic or therapeutic purposes, to a living cell. Methods of use and composition matters are within the scope of this disclosure.

13 Claims, 15 Drawing Sheets
Specification includes a Sequence Listing.

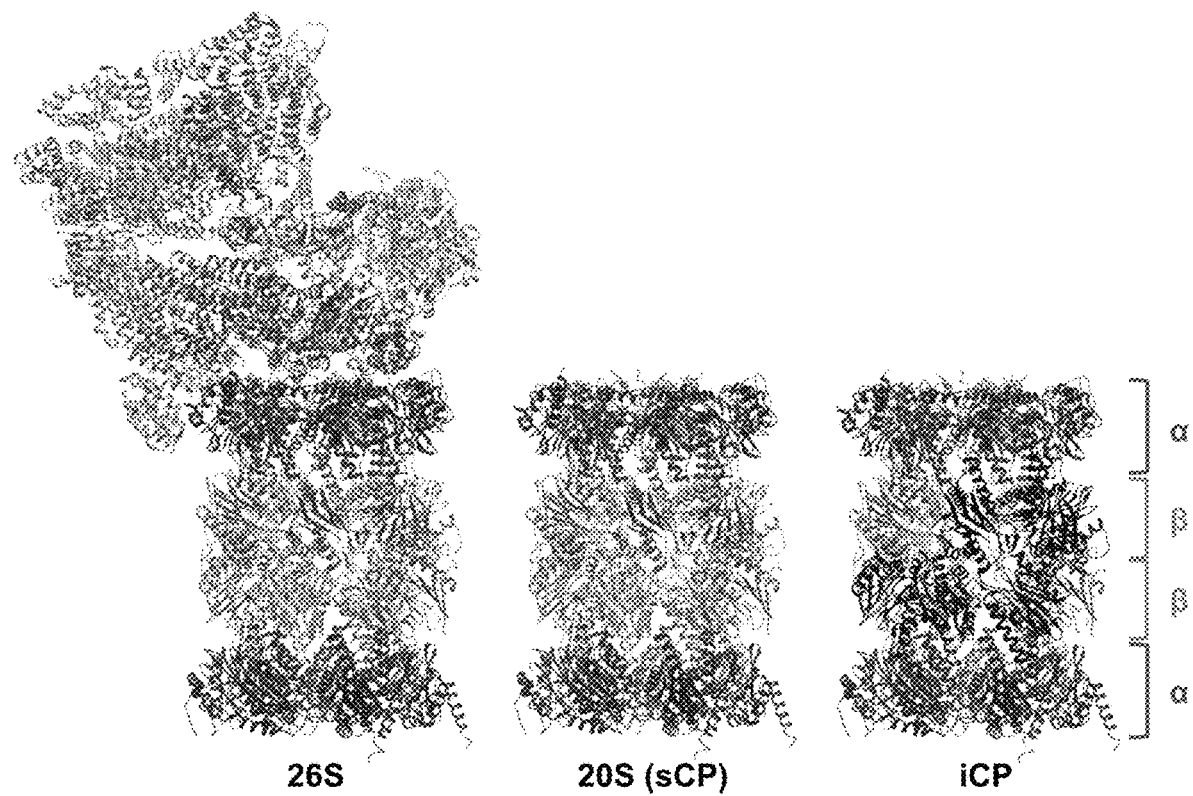
FIG. 1
Fig. 2A
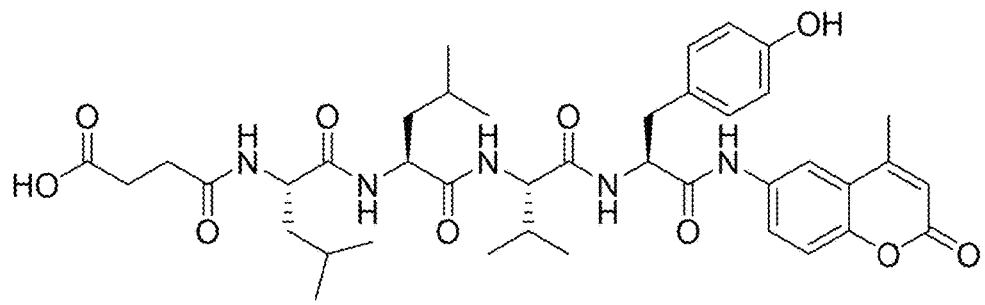
FIG. 2B
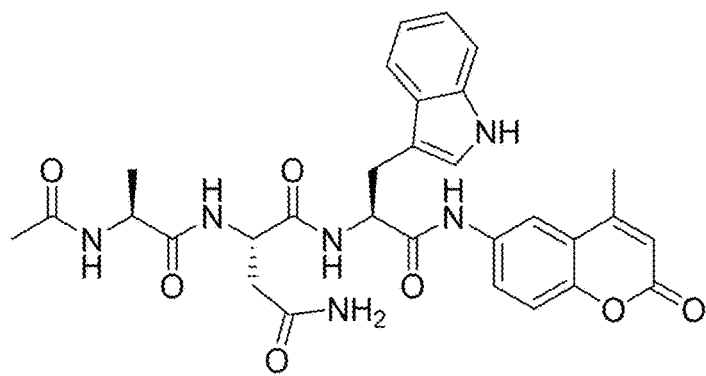

METHOD AND COMPOSITION MATTER FOR IMMUNOPROTEASOME-MEDIATED DELIVERY INTO LIVING CELLS

CROSS-REFERENCE TO RELATED APPLICATIONS

The present U.S. patent U.S. patent application is a national stage entry under 35 U.S.C. § 371 (b) of International Application No. PCT/US20/15540, filed on Jan. 29, 2020, which relates to and claims the priority benefits of U.S. Provisional Application Ser. No. 62/801,640, filed Feb. 5, 2019, the content of which is hereby incorporated by reference in its entirety into the present disclosure.

FIELD OF INVENTION

The present invention generally relates to methods and composition matters for delivery of a cargo to a living cell over producing immunoproteasomes. More specifically the invention disclosed is a molecular construct that delivers a cargo, for diagnostic or therapeutic purposes, to a living cell. Methods of use and composition matters are within the scope of this disclosure.

STATEMENT OF SEQUENCE LISTING

A computer-readable form (CRF) of the Sequence Listing is submitted with this application. The file, generated on Jan. 29, 2020, is entitled 68454-02_Seq_Listing_ST25_txt, the contents of which are incorporated herein in their entirety. Applicant states that the content of the computer-readable form is the same and the information recorded in computer readable form is identical to the written sequence listing.

BACKGROUND

This section introduces aspects that may help facilitate a better understanding of the disclosure. Accordingly, these statements are to be read in this light and are not to be understood as admissions about what is or is not prior art.

A proteasome is a multi-protein complex critical to maintaining healthy protein homeostasis in eukaryotic cells, as it is responsible for up to 90% of the protein degradation needs of a cell. In the ubiquitin-dependent pathway, the 26S proteasome, consisting of the 19S regulatory particle (19S RP) and the 20S catalytic particle (20S CP), degrades proteins that have been covalently modified with poly-ubiquitin chains.[1] For this process, the 19S RP first binds to and removes ubiquitin on tagged proteins then unfolds and unwinds proteins to feed into the 20S CP for hydrolysis.[2] The 20S CP is a barrel-shaped complex containing four heptameric rings; the middle two β rings each contain three subunits with individual protease-like activities and the outer α rings serve as gates in and out of the complex (FIG. 1).

Without the RP, the CP is still capable of degrading small, disordered proteins in an ubiquitin-independent manner and an average of about 60% of the CP in a cell exists as this uncapped form.[3-5] Various isoforms of the 20S CP have been observed, depending on the cell type and environment. These include the standard CP (sCP), found in most healthy cells, and the immunoproteasome (iCP), present in immune cells and cells that have encountered various pro-inflammatory signals.[6-9] These two isoforms differ in the primary structure of their catalytically active subunits, β1, β2 and β5. Under inflammatory conditions, such as the exposure to interferon gamma (IFN-γ), expression of β1i, β2i and β5i is turned on and these proteins are incorporated as new CPs are assembled. Overall, these structural changes result in a difference in the substrate preferences of the iCP compared to the sCP.[10] As such, the same protein can be degraded by both isoforms but yield different peptide products. This is particularly useful as one of the major roles of the iCP is to produce MHC-I compatible peptides. These different peptides can then be used to alert the immune system to the cause of inflammation with a smaller chance of wrongfully affecting healthy cells.

Both the sCP and iCP have been found to be overexpressed in various diseases.[11-21] However, due to their structural similarity, designing selective molecules is not trivial. Small molecule activity-based probes have been developed to monitor the activity of the sCP or iCP with the most common being aminomethyl coumarin (AMC)-based peptides[22] or peptides with fluorescence resonance energy transfer pairs[23,24] (FIG. 2A). Several AMC-peptides are commercially available and include structures that are selective for the different β subunits, including those of the iCP (FIG. 2B). Unfortunately, these structures suffer from poor selectivity to other cellular proteases and cannot efficiently cross the cell membrane. As such, they are most often used for in vitro assays with either purified proteasomes or cell lysate.

There have been iCP activity probes developed by the Overkleeft group and others.[25,26] These probes can be used to decipher the 15 various proteasome subtypes. They use a set of fluorescence resonance energy transfer (FRET) probes and then, using native-PAGE, can determine what isoform of the proteasome is present in a cell line of interest. This is an elegant use of activity-based probes to evaluate proteasome composition, but is limited in throughput because its analysis is performed by native-PAGE. These probes and others are also based on proteasome inhibitors and limits their ability to be used to monitor proteasome activity because the probe then prevents any further proteasome activity.[27]

Therefore, there are unmet needs in selective delivery of a cargo to a proteasome for diagnostic and therapeutic purposes, as well as for monitoring the biological activities of a proteasome in a living cell.

SUMMARY OF THE INVENTION

The present invention generally relates to methods and composition matters for delivery of a cargo to a living cell over producing immunoproteasomes. More specifically the invention disclosed is a molecular construct that delivers a cargo, for diagnostic or therapeutic purposes, to a living cell. Methods of use and composition matters are within the scope of this disclosure.

In some illustrative embodiments, the present invention relates to a composition matter for delivering a cargo into a living cell comprising a formula (I)

(SEQ ID NO: 1)

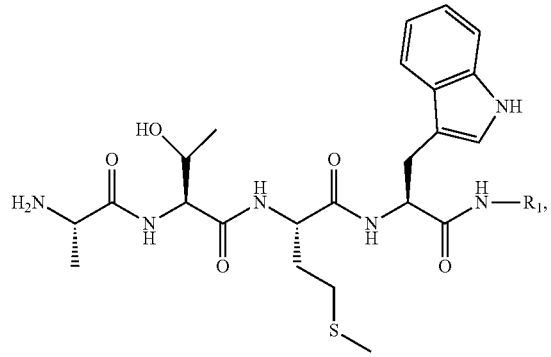

(I)

or a salt thereof, wherein $R_1$ is said cargo to be delivered to said living cell.

In some preferred embodiments, the present invention relates to a composition matter for delivering a cargo into a living cell as disclosed herein, wherein said cargo comprises an antigenic peptide derived from proteins expressed in cancer cells, a peptide derived from a bacterial or viral protein, a cytotoxic moiety, a moiety that is recognized by CAR T-cells, or a fluorescent compound.

In some illustrative embodiments, the present invention relates to a composition matter for delivering a cargo into a living cell as disclosed herein, wherein said cargo further comprises a moiety that helps penetrate said living cell membrane and delivers said cargo.

In some illustrative embodiments, the present invention relates to a composition matter for delivering a cargo into a living cell as disclosed herein, wherein said moiety that helps penetrate said living cell membrane comprises (SEQ ID NO: 2)

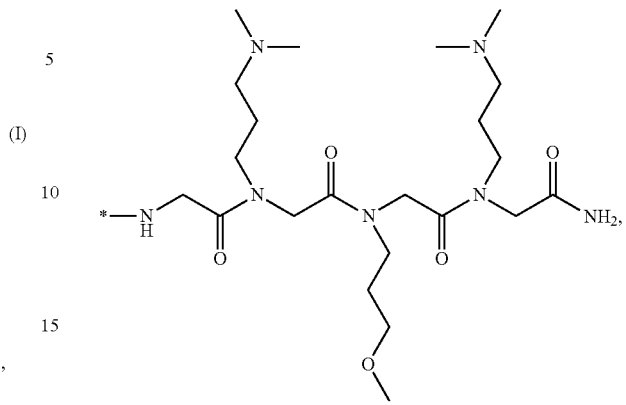

(II)

or a salt thereof, wherein *- denotes the connection point.

In some illustrative embodiments, the present invention relates to a composition matter for delivering a cargo into a living cell as disclosed herein, wherein said living cell is a cell over producing immunoproteasomes.

In some illustrative embodiments, the present invention relates to a composition matter for delivering a cargo into a living cell as disclosed herein, wherein said cell over producing immunoproteasomes is a diseased cell.

In some illustrative embodiments, the present invention relates to a composition matter for delivering a cargo into a living cell as disclosed herein, wherein said cargo comprises a fluorescent probe.

In some illustrative embodiments, the present invention relates to a composition matter for delivering a cargo into a living cell as disclosed herein, wherein said fluorescence probe further comprises a moiety that penetrates said living cell membrane and delivers said fluorescent probe into the living cell.

In some illustrative embodiments, the present invention relates to a composition matter for delivering a cargo into a living cell as disclosed herein, wherein said fluorescent probe has a formula of

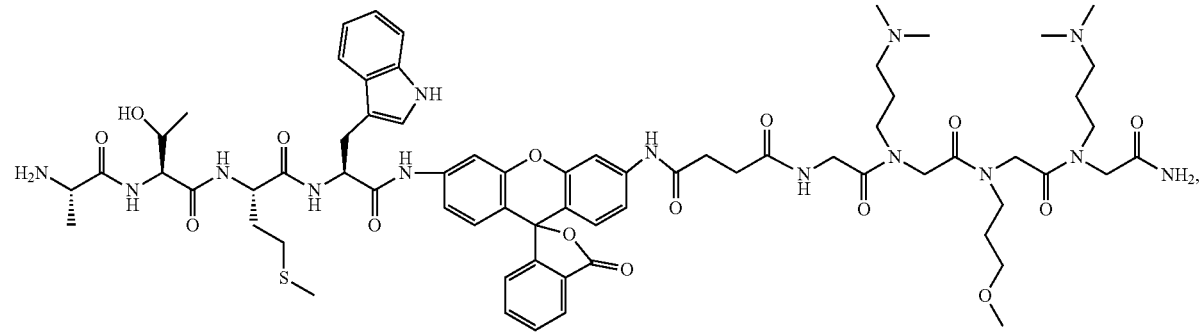

or a salt thereof.

In some illustrative embodiments, the present invention relates to a method for monitoring biological activities of an immunoproteasome of a living cell comprising the step of applying an effective amount of the composition matter as disclosed herein.

In some illustrative embodiments, the present invention relates to a composition matter for delivering a cargo into a living cell as disclosed herein, wherein said fluorescence probe is used for monitoring biological activities of a proteasome of a living cell.

In some illustrative embodiments, the present invention relates to a composition matter for delivering a cargo into a living cell as disclosed herein, wherein said proteasome is an immunoproteasome.

In some illustrative embodiments, the present invention relates to a composition matter for delivering a cargo into a living cell as disclosed herein, wherein said living cell is a diseased cell over producing immunoproteasomes.

In some illustrative embodiments, the present invention relates to a method for monitoring biological activities of an immunoproteasome of a living cell comprising the step of applying an effective amount of a compound of (I)

(SEQ ID NO: 1)

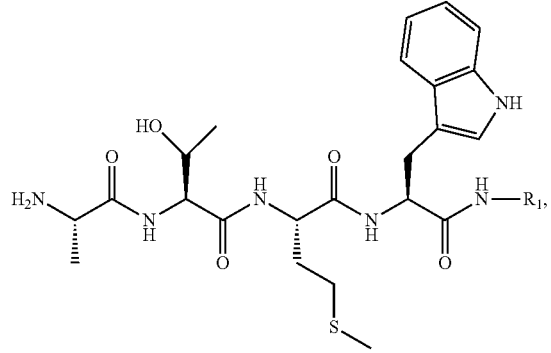

(I)

(SEQ ID NO: 2)

or a salt thereof, wherein $R_1$ is a label or probe as a method of readout.

In some illustrative embodiments, the present invention relates to a method for monitoring biological activities of an immunoproteasome of a living cell as disclosed herein, wherein said label or probe comprises a fluorescence moiety.

In some illustrative embodiments, the present invention relates to a method for monitoring biological activities of an immunoproteasome of a living cell as disclosed herein, wherein said label or probe further comprises a moiety that penetrates said living cell membrane and delivers said label or probe into the living cell.

In some illustrative embodiments, the present invention relates to a method for monitoring biological activities of an immunoproteasome of a living cell as disclosed herein, wherein said moiety that helps penetrate said living cell membrane comprises

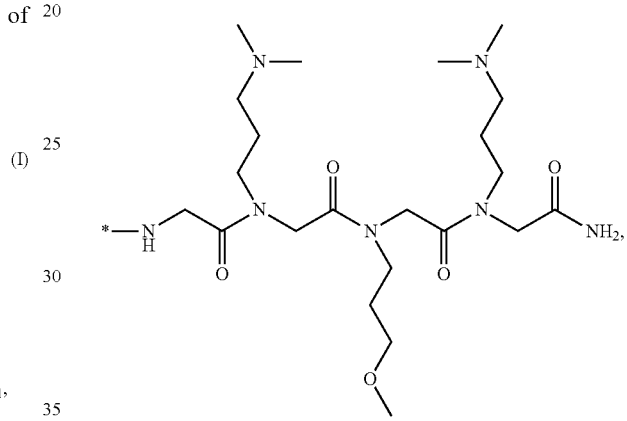

(II)

or a salt thereof, wherein *- denotes the connection point.

In some illustrative embodiments, the present invention relates to a method for monitoring biological activities of an immunoproteasome of a living cell as disclosed herein, wherein said label or probe has a formula of

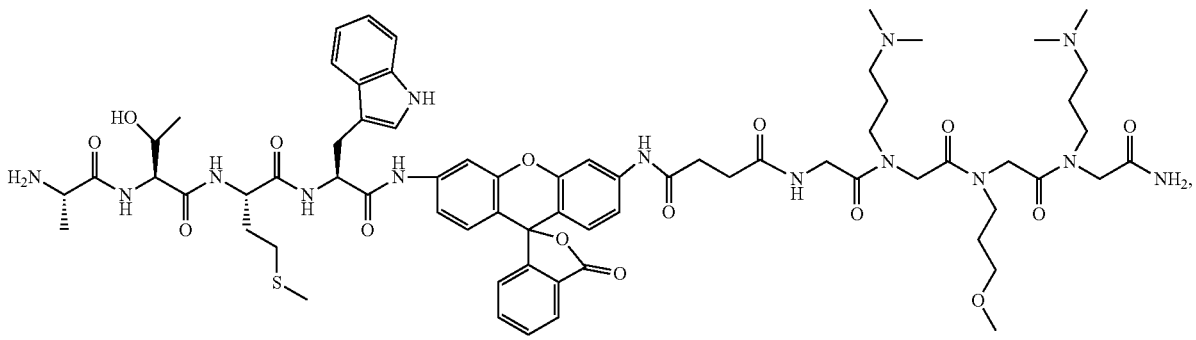

or a salt thereof.

In some illustrative embodiments, the present invention relates to a method for monitoring biological activities of an immunoproteasome of a living cell as disclosed herein, wherein said living cell is a diseased cell over producing immunoproteasomes.

In some illustrative embodiments, the present invention relates to a method for delivering a cargo to a living cell for diagnostic or therapeutic purposes comprising the steps of applying an effective amount of a compound of (I)

(SEQ ID NO: 1)

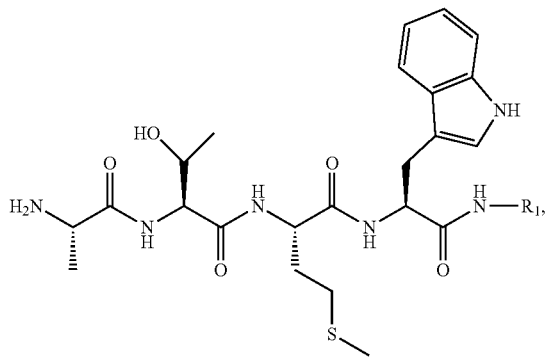

(I)

or a salt thereof, wherein $R_1$ is said cargo to be delivered to said living cell.

In some illustrative embodiments, the present invention relates to a method for delivering a cargo to a living cell for diagnostic or therapeutic purposes as disclosed herein, wherein said cargo comprises an antigenic peptide derived from proteins expressed in cancer cells, a peptide derived from a bacterial or viral protein, a cytotoxic moiety, a moiety that is recognized by CAR T-cells, or a fluorescent compound.

In some illustrative embodiments, the present invention relates to a method for delivering a cargo to a living cell for diagnostic or therapeutic purposes as disclosed herein, wherein said fluorescent compound comprises rhodamine or a fluorescein derivative.

In some illustrative embodiments, the present invention relates to a method for delivering a cargo to a living cell for diagnostic or therapeutic purposes as disclosed herein, wherein said cargo further comprises a moiety that helps penetrate said living cell membrane and delivers said cargo, wherein said moiety that penetrates said living cell membrane comprises

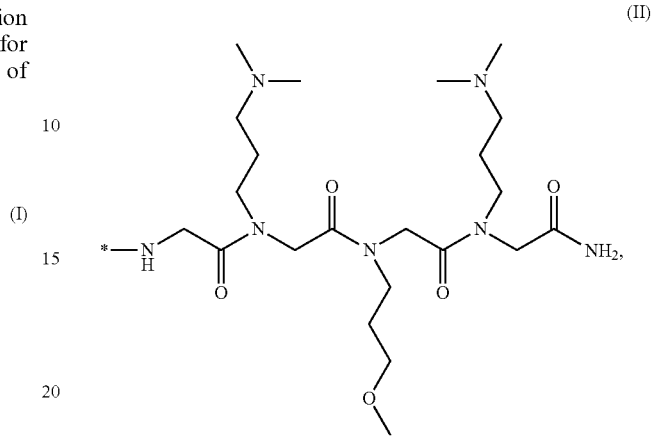

(II)

or a salt thereof, wherein *- denotes the connection point.

In some illustrative embodiments, the present invention relates to a method for delivering a cargo to a living cell for diagnostic or therapeutic purposes as disclosed herein, wherein said living cell is a cell over producing immunoproteasomes.

In some illustrative embodiments, the present invention relates to a method for delivering a cargo to a living cell for diagnostic or therapeutic purposes as disclosed herein, wherein said cell over producing immunoproteasomes is a diseased cell.

In some illustrative embodiments, the present invention relates to a method for delivering a cargo to a living cell for diagnostic or therapeutic purposes as disclosed herein, wherein said cargo comprises a fluorescent probe.

In some illustrative embodiments, the present invention relates to a method for delivering a cargo to a living cell for diagnostic or therapeutic purposes as disclosed herein, wherein said fluorescent probe further comprises a moiety that penetrates said living cell membrane and delivers said fluorescent probe into the living cell.

In some preferred embodiments, the present invention relates to a method for delivering a cargo to a living cell for diagnostic or therapeutic purposes as disclosed herein, wherein said fluorescent probe has a formula of (SEQ ID NO: 2)

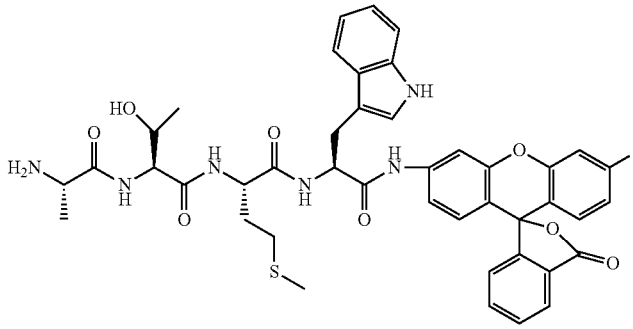

or a salt thereof.

In some illustrative embodiments, the present invention relates to a method for delivering a cargo to a living cell for diagnostic or therapeutic purposes as disclosed herein, wherein said fluorescent probe is used for monitoring biological activities of a proteasome of a living cell.

These and other features, aspects and advantages of the present invention will become better understood with reference to the following figures, detailed descriptions and associated claims.

BRIEF DESCRIPTION OF THE DRAWINGS

These and other features, aspects and advantages of the present invention will be better understood with reference to the following figures, descriptions and claims.

FIG. 1. The proteasome exists in several different isoforms. The 26S consists of the 20S catalytic particle (purple and blue) and the 19S regulatory particle (green=ATPase ring; orange=non-ATPase subunits). The 20S can hydrolyze small, disordered proteins independent of the 19S RP. Upon encountering inflammatory signals, such as IFN-γ, three new β subunits are expressed and the iCP is formed. Immunosubunits are shown in navy blue. PDB ID 5GJQ.

FIG. 2. Several substrate probes for the proteasome have been reported. This includes several commercially available aminomethyl coumarin probes selective for the sCP ((β5, FIG. 2A) the iCP (β5i, FIG. 2B).

FIG. 11B: sCP.

FIG. 12B: sCP.

DETAILED DESCRIPTION

Figure 3A:
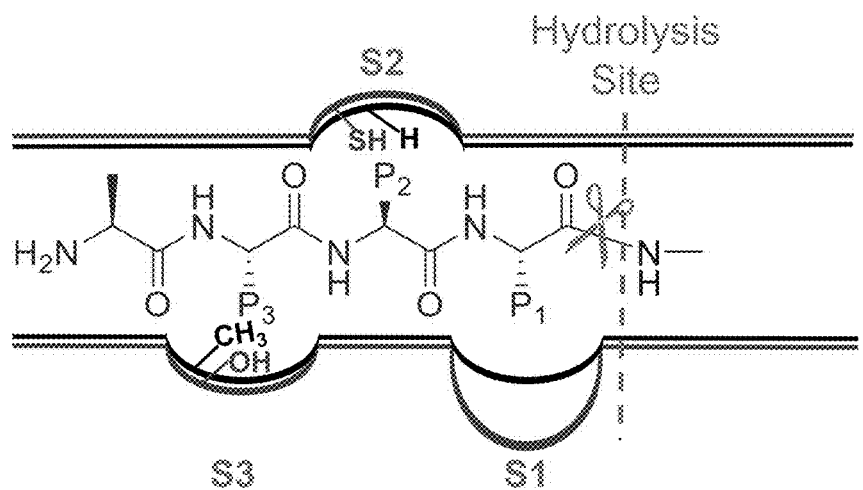
FIG. 3A. Overlaying the crystal structures from the human sCP and iCP at the active site shows the differences in substrate binding pockets of the two isoforms.

While the concepts of the present disclosure are illustrated and described in detail in the figures and the description herein, results in the figures and their description are to be considered as exemplary and not restrictive in character; it being understood that only the illustrative embodiments are shown and described and that all changes and modifications that come within the spirit of the disclosure are desired to be protected.

Unless defined otherwise, the scientific and technology nomenclatures have the same meaning as commonly understood by a person in the ordinary skill in the art pertaining to this disclosure. In the present disclosure the term "about" can allow for a degree of variability in a value or range, for example, within 10%, within 5%, or within 1% of a stated value or of a stated limit of a range. In the present disclosure the term "substantially" can allow for a degree of variability in a value or range, for example, within 90%, within 95%, or within 99% of a stated value or of a stated limit of a range.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In some illustrative embodiments, the present invention relates to a composition matter for delivering a cargo into a living cell comprising a formula (I)

(SEQ ID NO: 1)

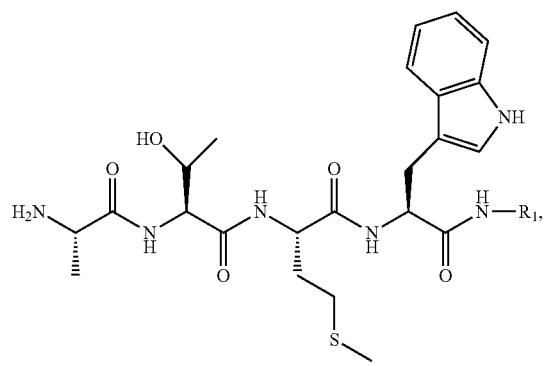

(I)

or a salt thereof, wherein $R_1$ is said cargo to be delivered to said living cell.

In some illustrative embodiments, the present invention relates to a composition matter for delivering a cargo into a living cell as disclosed herein, wherein said cargo comprises an antigenic peptide derived from proteins expressed in cancer cells, a peptide derived from a bacterial or viral protein, a cytotoxic moiety, a moiety that is recognized by CAR T-cells, or a fluorescent compound.

In some illustrative embodiments, the present invention relates to a composition matter for delivering a cargo into a living cell as disclosed herein, wherein said cargo further comprises a moiety that helps penetrate said living cell membrane and delivers said cargo.

In some illustrative embodiments, the present invention relates to a composition matter for delivering a cargo into a living cell as disclosed herein, wherein said moiety that penetrates said living cell membrane comprises

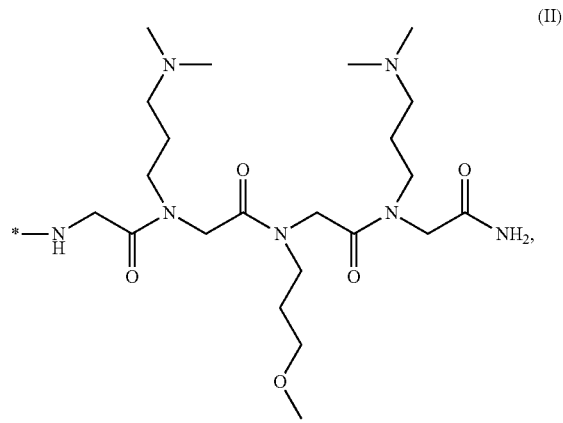 [SMILES: *NCC(=O)N(CCCN(C)C)CC(=O)N(CCCOC)CC(=O)N(CCCN(C)C)CC(N)=O]

(II)

or a salt thereof, wherein *- denotes the connection point.

In some illustrative embodiments, the present invention relates to a composition matter for delivering a cargo into a living cell as disclosed herein, wherein said living cell is a cell over producing immunoproteasomes.

In some illustrative embodiments, the present invention relates to a composition matter for delivering a cargo into a living cell as disclosed herein, wherein said cell over producing immunoproteasomes is a diseased cell.

In some illustrative embodiments, the present invention relates to a composition matter for delivering a cargo into a living cell as disclosed herein, wherein said cargo comprises a fluorescent probe.

In some illustrative embodiments, the present invention relates to a composition matter for delivering a cargo into a living cell as disclosed herein, wherein said fluorescence probe further comprises a moiety that penetrates said living cell membrane and delivers said fluorescent probe into the living cell.

In some illustrative embodiments, the present invention relates to a composition matter for delivering a cargo into a living cell as disclosed herein, wherein said fluorescent probe has a formula of (SEQ ID NO: 2)

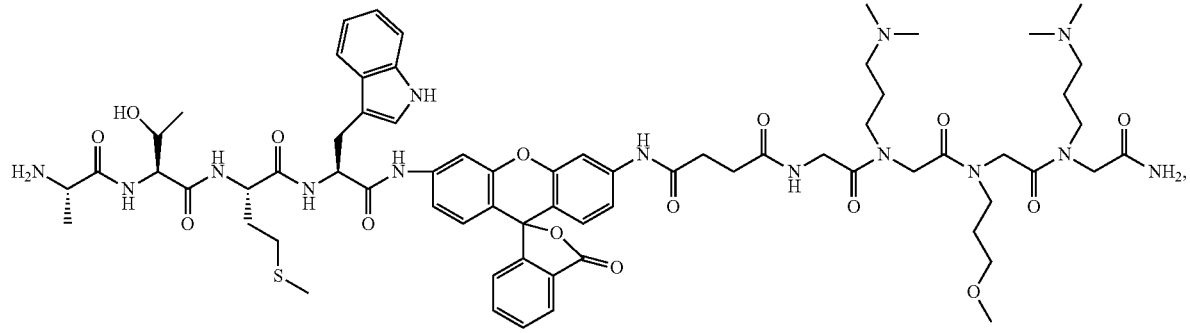

or a salt thereof.

In some illustrative embodiments, the present invention relates to a method for monitoring biological activities of an immunoproteasome of a living cell comprising the step of applying an effective amount of the composition matter as disclosed herein.

In some illustrative embodiments, the present invention relates to a composition matter for delivering a cargo into a living cell as disclosed herein, wherein said fluorescence probe is used for monitoring biological activities of a proteasome of a living cell.

In some illustrative embodiments, the present invention relates to a composition matter for delivering a cargo into a living cell as disclosed herein, wherein said proteasome is an immunoproteasome.

In some illustrative embodiments, the present invention relates to a composition matter for delivering a cargo into a living cell as disclosed herein, wherein said living cell is a diseased cell over producing immunoproteasomes.

In some illustrative embodiments, the present invention relates to a method for monitoring biological activities of an immunoproteasome of a living cell comprising the step of applying an effective amount of a compound of (I)

(SEQ ID NO: 1)

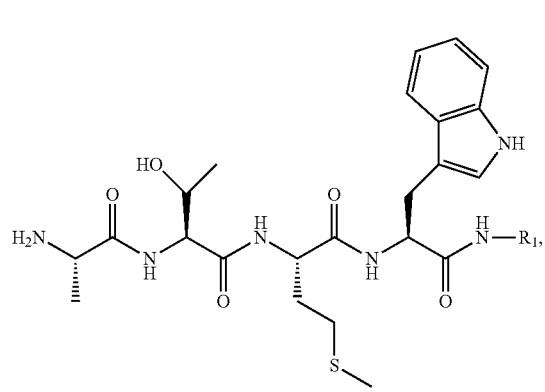

(I)

or a salt thereof, wherein $R_1$ is a label or probe as a method of readout.

In some illustrative embodiments, the present invention relates to a method for monitoring biological activities of an immunoproteasome of a living cell as disclosed herein, wherein said label or probe comprises a fluorescence moiety.

In some illustrative embodiments, the present invention relates to a method for monitoring biological activities of an immunoproteasome of a living cell as disclosed herein, wherein said label or probe further comprises a moiety that penetrates said living cell membrane and delivers said label or probe into the living cell.

In some illustrative embodiments, the present invention relates to a method for monitoring biological activities of an immunoproteasome of a living cell as disclosed herein, wherein said moiety that helps penetrate said living cell membrane comprises

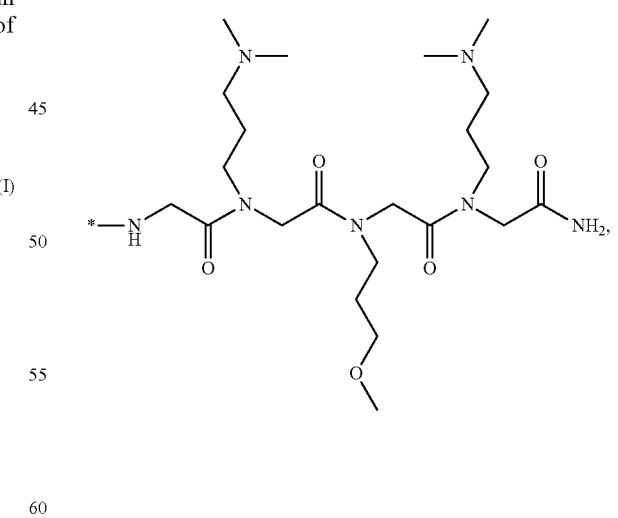

(II)

or a salt thereof, wherein *- denotes the connection point.

In some illustrative embodiments, the present invention relates to a method for monitoring biological activities of an immunoproteasome of a living cell as disclosed herein, wherein said label or probe has a formula of (SEQ ID NO: 2)

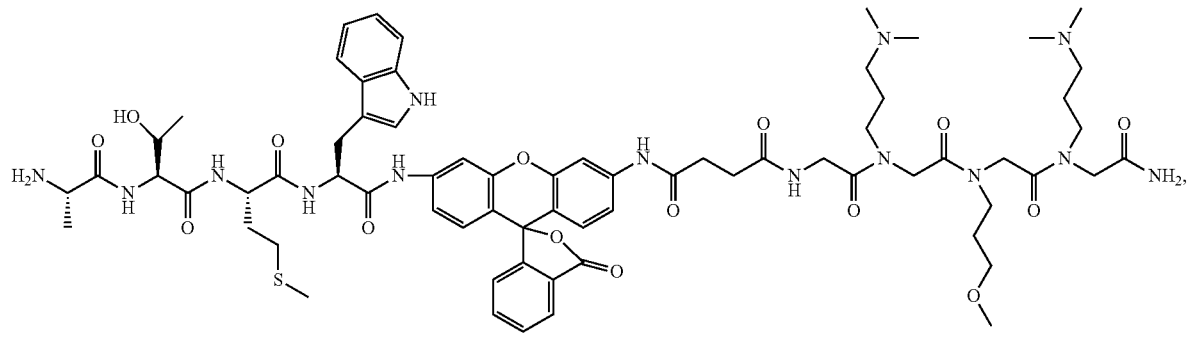

or a salt thereof.

In some illustrative embodiments, the present invention relates to a method for monitoring biological activities of an immunoproteasome of a living cell as disclosed herein, wherein said living cell is a diseased cell over producing immunoproteasomes.

In some illustrative embodiments, the present invention relates to a method for delivering a cargo to a living cell for diagnostic or therapeutic purposes comprising the steps of applying an effective amount of a compound of (I)

(SEQ ID NO: 1)

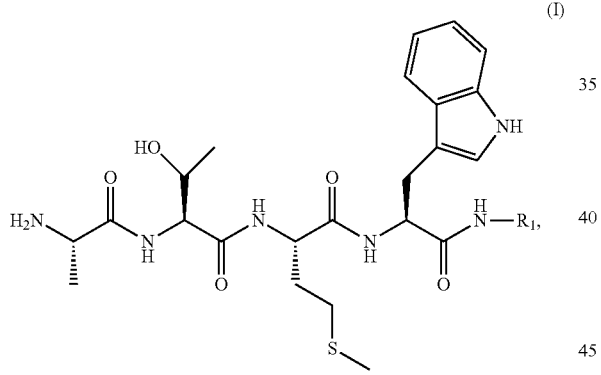

(I)

or a salt thereof, wherein $R_1$ is said cargo to be delivered to said living cell.

In some illustrative embodiments, the present invention relates to a method for delivering a cargo to a living cell for diagnostic or therapeutic purposes as disclosed herein, wherein said cargo comprises an antigenic peptide derived from proteins expressed in cancer cells, a peptide derived from a bacterial or viral protein, a cytotoxic moiety, a moiety that is recognized by CAR T-cells, or a fluorescent compound.

In some illustrative embodiments, the present invention relates to a method for delivering a cargo to a living cell for diagnostic or therapeutic purposes as disclosed herein, wherein said fluorescent compound comprises rhodamine or a fluorescein derivative.

In some illustrative embodiments, the present invention relates to a method for delivering a cargo to a living cell for diagnostic or therapeutic purposes as disclosed herein, wherein said cargo further comprises a moiety that helps penetrate said living cell membrane and delivers said cargo.

In some illustrative embodiments, the present invention relates to a method for delivering a cargo to a living cell for diagnostic or therapeutic purposes as disclosed herein, wherein said moiety that penetrates said living cell membrane comprises

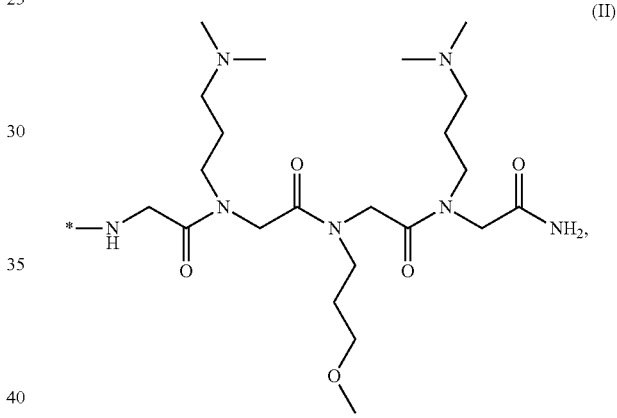

(II)

or a salt thereof, wherein *- denotes the connection point.

In some illustrative embodiments, the present invention relates to a method for delivering a cargo to a living cell for diagnostic or therapeutic purposes as disclosed herein, wherein said living cell is a cell over producing immunoproteasomes.

In some illustrative embodiments, the present invention relates to a method for delivering a cargo to a living cell for diagnostic or therapeutic purposes as disclosed herein, wherein said cell over producing immunoproteasomes is a diseased cell.

In some illustrative embodiments, the present invention relates to a method for delivering a cargo to a living cell for diagnostic or therapeutic purposes as disclosed herein, wherein said cargo comprises a fluorescent probe.

In some illustrative embodiments, the present invention relates to a method for delivering a cargo to a living cell for diagnostic or therapeutic purposes as disclosed herein, wherein said fluorescent probe further comprises a moiety that penetrates said living cell membrane and delivers said fluorescent probe into the living cell.

In some preferred embodiments, the present invention relates to a method for delivering a cargo to a living cell for diagnostic or therapeutic purposes as disclosed herein, wherein said fluorescent probe has a formula of (SEQ ID NO: 1)

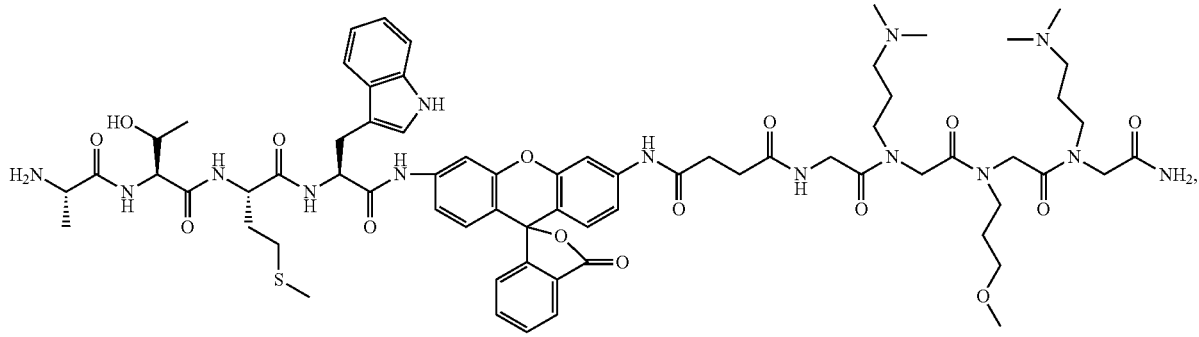

or a salt thereof.

In some illustrative embodiments, the present invention relates to a method for delivering a cargo to a living cell for diagnostic or therapeutic purposes as disclosed herein, wherein said fluorescent probe is used for monitoring biological activities of a proteasome of a living cell.

In some illustrative embodiments, the present invention relates to a method for delivering a cargo to a living cell for diagnostic or therapeutic purposes as disclosed herein, wherein said proteasome is an immunoproteasome.

In some illustrative embodiments, the present invention relates to a method for delivering a cargo to a living cell for diagnostic or therapeutic purposes as disclosed herein, wherein said living cell is a diseased cell over producing immunoproteasomes.

Activity-based probes have greatly improved our understanding of the intrinsic roles and expression levels of various proteins within cells. In order to be useful in live cells, probes must be cell permeable and provide a read-out that can be measured without disrupting the cells or the activity of the target. Unfortunately, probes for the various forms of the proteasome that can be utilized in intact cells are limited; commercially available probes are most effectively used with purified protein or cell lysate. The proteasome, both the 26S and various isoforms of the 20S CP, is an important target with reported roles in cancer, autoimmune disorders and neurodegenerative diseases.

Here, we present the development of a selective probe for the immunoproteasome, a specialized isoform of the 20S proteasome that becomes expressed in cells that encounter an inflammatory signal. Using a one-bead-one-compound library of small peptides, we discovered a trimer sequence efficiently cleaved by the immunoproteasome with significant selectivity over the standard proteasome. Upon conjugating this sequence to rhodamine 110 and a peptoid, we generated a probe with a considerable improvement in sensitivity compared to current aminomethylcoumarin-based proteasome probes. Importantly, our probe was capable of labeling immunoproteasome-expressing cells while maintaining its selectivity over other cellular proteases in live cell cultures. We anticipate this probe to find wide utility in those that wish to study the immunoproteasome's activity in a variety of cell lines and can be used as a reporter to discover small molecules that can perturb the activity of this proteasome isoform.

Figure 3B:
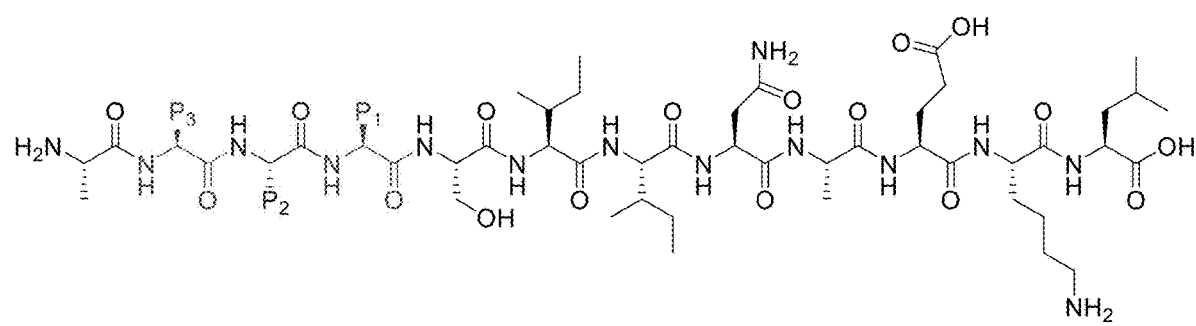
FIG. 3B. General design for our library, with the OVA (model antigen) in black and the three variable positions in red, blue and green.
Figure 3C:
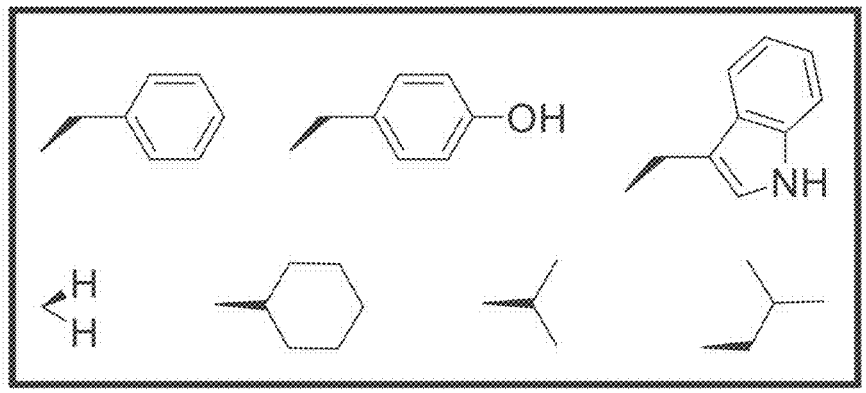
FIG. 3C. Seven amino acids were chosen for each position, based on structures hypothesized to favor substrate binding to the iCP.
Figure 3C:
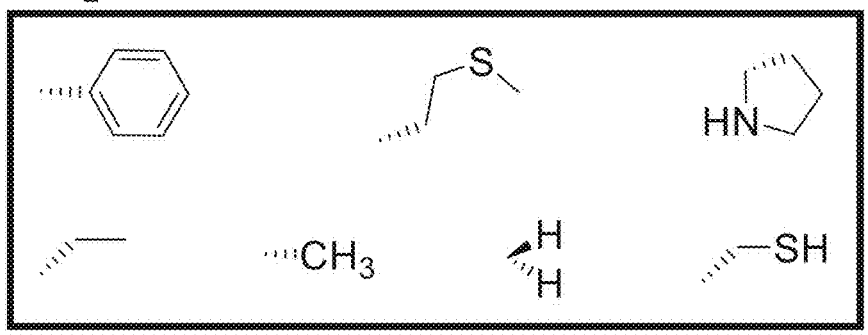
Figure 3C:
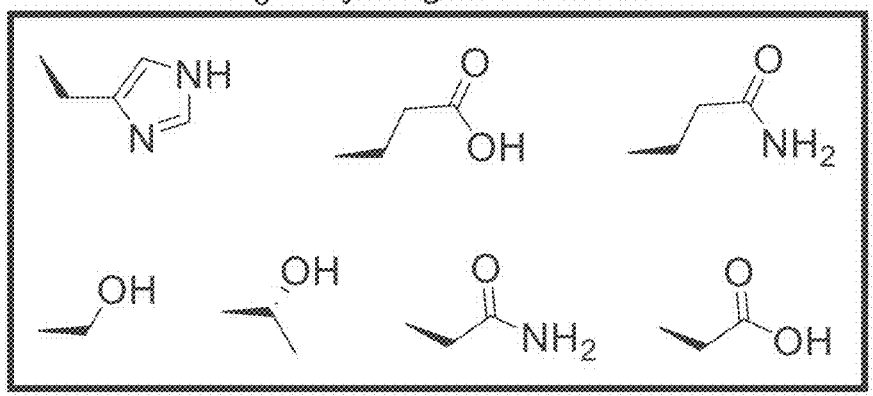

With the solving of crystal structures for both the sCP and iCP,[10] it is possible to rationally design selective molecules based on differences in substrate binding pockets. The crystal structures have also provided evidence for selectivity of previously published inhibitors, such as bortezomib and carfilzomib.[21,28,29] Using this crystallographic data and the features of known inhibitors, we hypothesized a trimer peptide with residues favoring binding to its substrate binding pockets would allow for selective cleavage by the iCP. We chose to approach this by screening a one-bead-one-compound library of trimers attached to a common peptide. To select which amino acids to incorporate at each position of our library, we first focused on the binding pockets surrounding the β5 subunit, which is responsible for the chymotrypsin-like activity of the CP (FIG. 3A). For S1, the iCP has a larger hydrophobic pocket, so we selected residues with builder side chains for P1. The S2 pocket has a more conservative change from glycine in the sCP to cysteine in the iCP; therefore, amino acids for P2 are more random in structure. Finally, the S3 pocket in the iCP gains a hydroxyl group compared to the sCP. As to take advantage of the change in hydrogen bond properties, amino acids selected for P3 are a mixture of hydrogen bond donors and acceptors. The side chain structures for each position can be seen in FIG. 3C. With seven amino acids at each position, the full library contained 343 unique sequences attached to a common peptide. For the universal peptide sequence in the library, we chose to use OVA. Derived from chicken ovalbumin, OVA is a well-known model for MHC-I compatible peptides[30-36] and has favorable structural features for LC/MS analysis because it can be retained on a traditional C-18 column and ionizes well. Our library was synthesized using a modified version of OVA, exchanging an alanine for the phenylalanine in the sequence. This was done to limit off-target cleavage, as phenylalanine is a cleavage signal recognized by the β5 subunit. The general structure of the library can be found in FIG. 3B.

The library was synthesized using standard Fmoc-based solid phase peptide synthesis with a split-and-pool method. In brief, the OVA sequence was first loaded onto Fmoc-Leu Wang resin. After Fmoc removal from the serine, the resin was split evenly into seven fractions, each receiving the necessary reagents for coupling one amino acid. When all couplings were complete, the resin was recombined for Fmoc removal and the process was repeated for P2 and P3. Finally, an alanine was conjugated as the N-terminal amino acid and its Fmoc was removed. Single beads were separated into wells of several 96 well plates, subjected to TFA cleavage and dried for storage. Twenty-four beads were used to check the quality of the library using MALDI. Of these, 90% were confidently matched to library sequences.

Looking for the peptides to be cleaved by the iCP, we planned to screen the library off resin. Cleaving a single bead in each well of a 96 well plate ensured that a single compound was contained in each sample. The next consideration we needed to take was how to screen for hits, which involved the destruction of the library compounds, while also being able to sequence the positive hits. To accomplish this, we settled on analyzing the screening samples by LC/MS. Using LC/MS provided us with the unique capabilities to separate the different components of our samples, including the full library peptide, cleavage products and the iCP, while simultaneously identifying them. As hits will be considered to be sequences that produce the desired OVA peptide, we can also use LC/MS to quantitate the relative amounts of OVA in each sample by comparing their extracted ion counts (EICs). Once samples have been recognized as hits, we can return to the LC/MS data for sequencing of the library peptide. We primarily concentrated on sequencing the full peptide sequence, but the corresponding tetramer cleavage product was also expected to be observed in each sample, offering a second possible point for sequencing.

Optimizing screening conditions, i.e. concentration of iCP and incubation time, was essential, as a balance between cleaving enough sample to observe an increase in OVA and leaving sufficient amounts of the full peptide for sequencing was necessary for a successful screen. We initially synthesized a control sequence, containing a phenylalanine in P1 and alanines in P2 and P3, for use in optimizing these conditions. This sequence was not expected to have any significant preference for the iCP or the sCP and thus also served as a baseline for later hit validation. Individual beads were separated into wells of a 96 well plate, cleaved and dissolved in the proteasome assay buffer at an average concentration of 5.2 µM, based on the average amount of peptide per bead. Samples were incubated at 37° C. with iCP at various concentrations and times in triplicate then analyzed by LC/MS. Focusing on the amount of OVA produced as well as being able to confidently sequence the full peptide, we found incubating each well in the presence of 4 nM iCP for six hours yielded the best balance of these two characteristics.

Figure 4A:
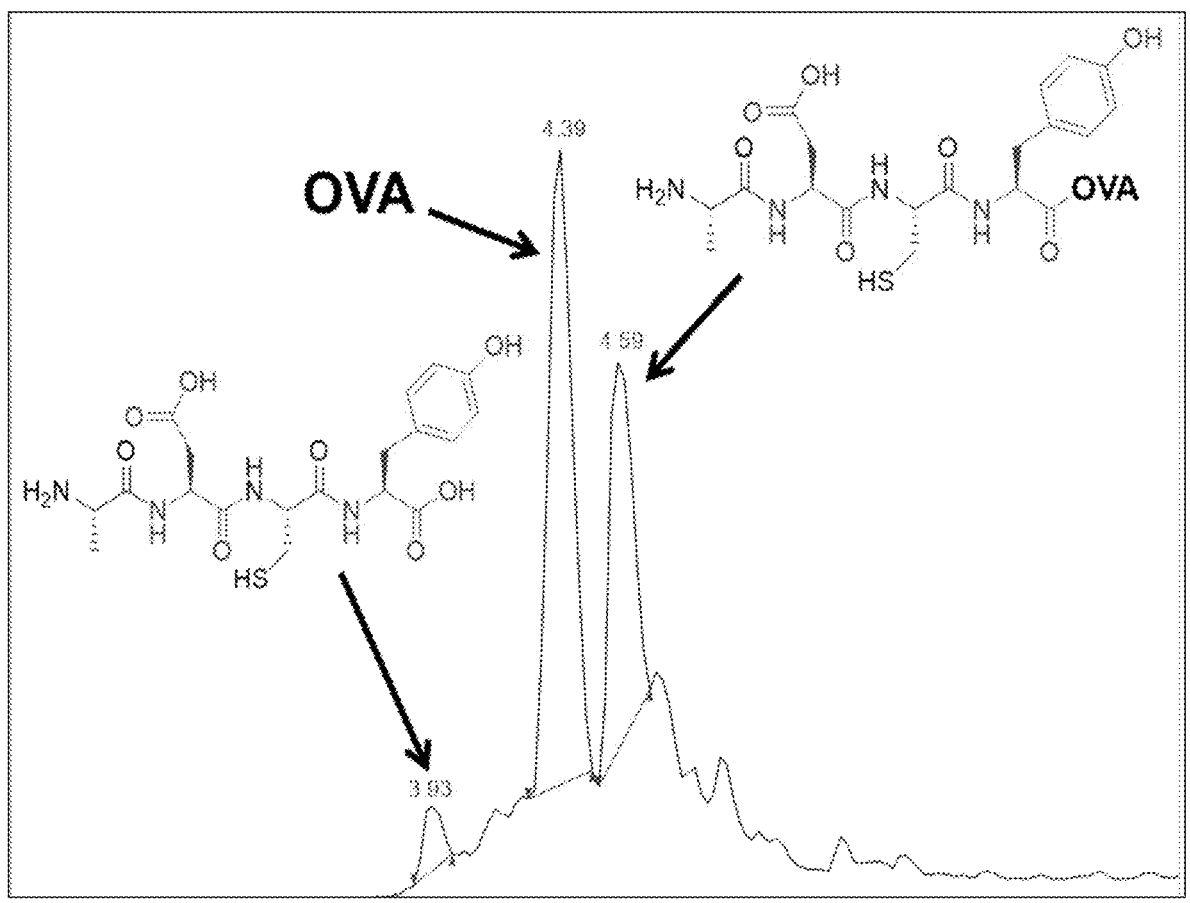
FIGS. 4A-4B. Our library was screened on single-bead level and analyzed by LC/MS. Examples LC/MS spectra shows a positive (FIG. 4A) and negative (FIG. 3B) hit, with peaks labeled with corresponding structures. To quantitatively rank hits, the mass of OVA was extracted from each sample. All hits synthesized were in the top 25% of samples based on the amount of OVA extracted. Shown in Table 1 are hits synthesized for validation, compared to the control sequence (bolded). The bold line separates the hits that were found to be negative from our screen.
Figure 4B:
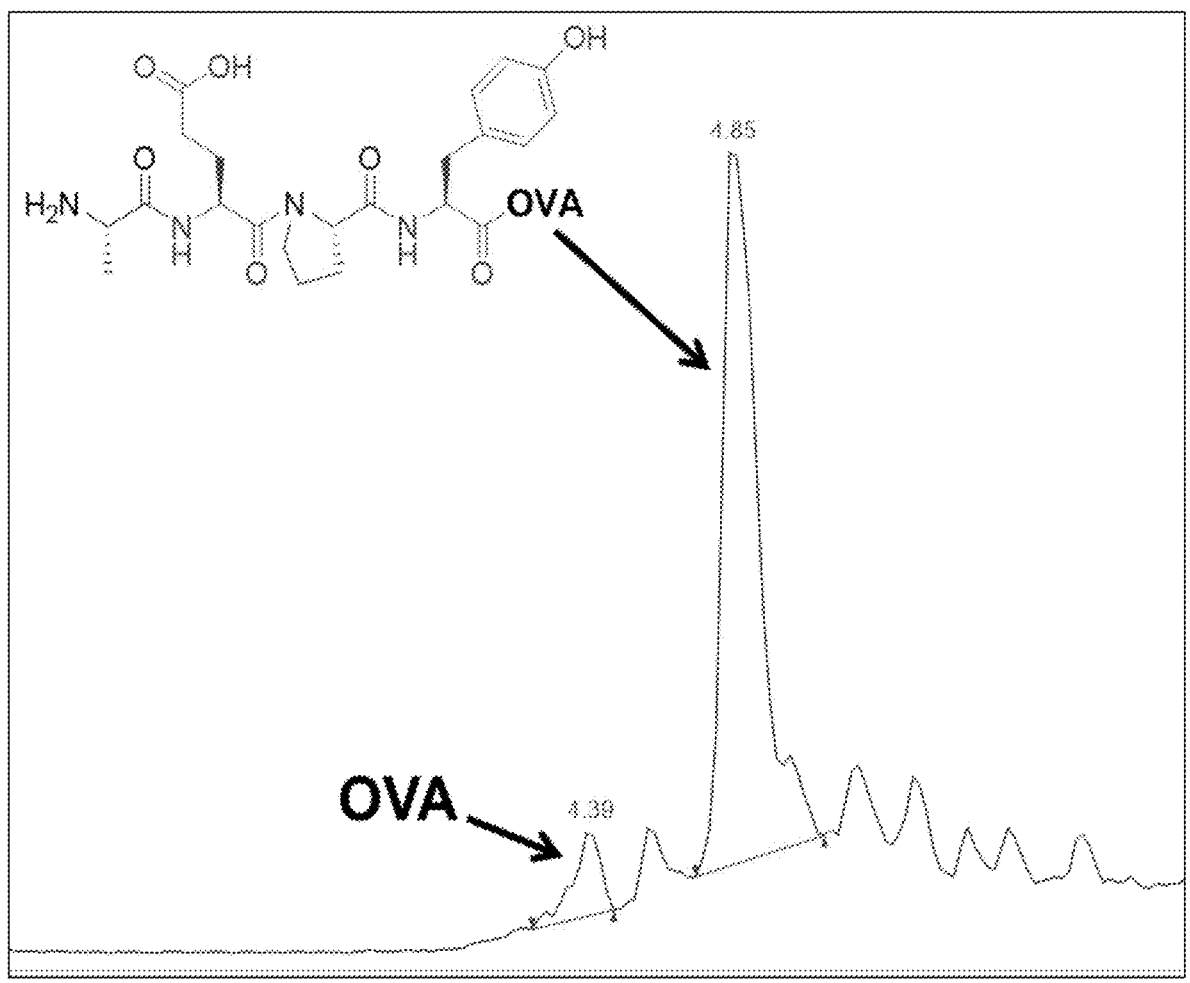

Library beads were screened in two separate rounds for a total of 403 beads, covering an extra 17% of library sequences. Example spectra can be seen in FIGS. 4A, 4B. For each sample, the mass of OVA was extracted from the LC/MS and the peak was integrated. Samples were then ranked within the two screen groups based on the area of the OVA peak and the top 60 hits were reanalyzed to determine their corresponding library sequences. In order to further prioritize sequences for validation, the percent occurrence of each amino acid was calculated based on the sequences of these hits (Table 3); nine sequences which contained amino acids observed most often were selected for validation. Additionally, we also determined the sequences of several low-ranking hits, selecting three to synthesize as negative controls.

Figure 5:
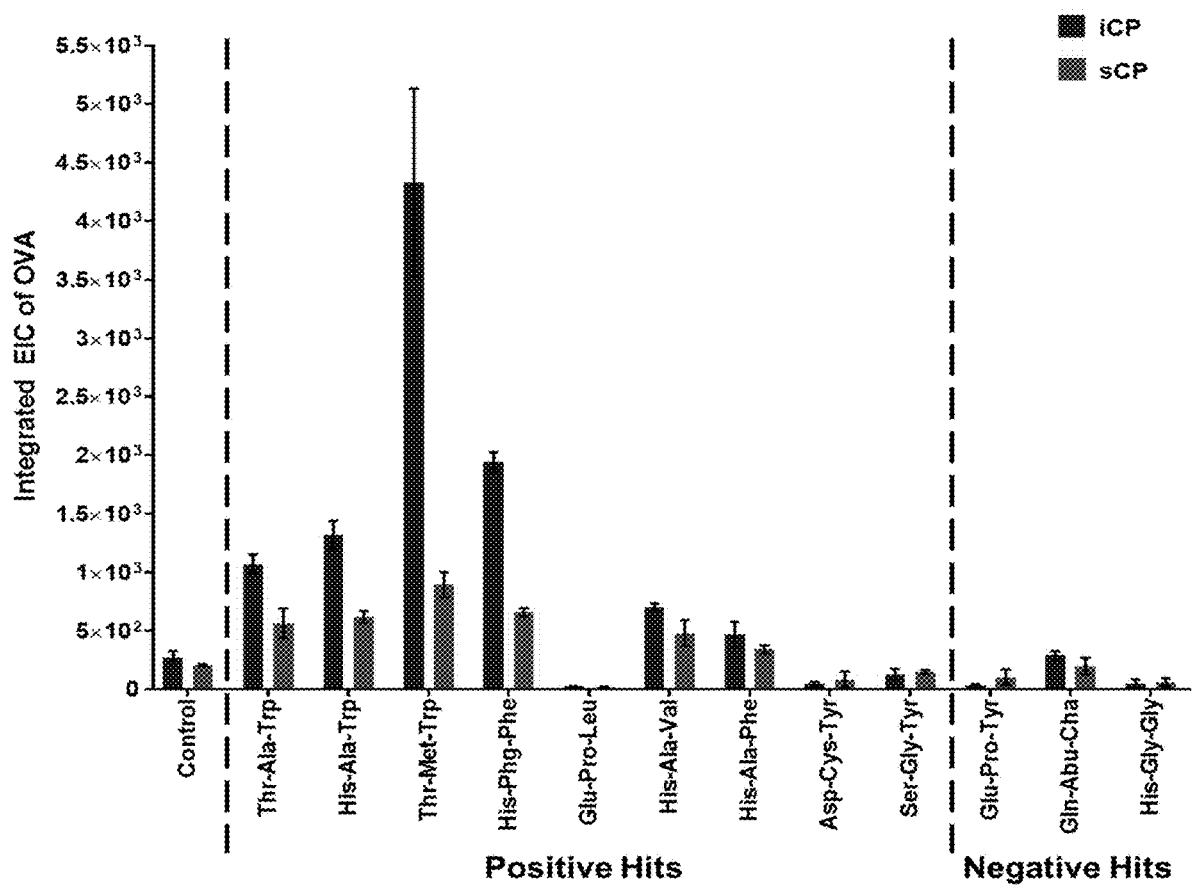
FIG. 5. Hit validation for selected sequences. Hits are named based on the three variable positions from C to N. Validation was performed in the same way as the screen, incubating 5.2 μM peptide with 4 nM iCP or sCP for six hours. In addition to nine positive hits, three negative hits were also selected for validation of our screen.

Validation assays were performed under similar conditions as the screen. Briefly, 5 µM of each hit peptide was incubated at 37° C. with 4 nM iCP for six hours in triplicate, then analyzed by LC/MS. All peptides were also analyzed under identical conditions using 4 nM sCP. This was done to confirm that our library design yielded the desired selectivity and not simply sequences that could be efficiently cleaved by either isoform. The mass of OVA was extracted and integrated for each sample, averaging the triplicates. These values were compared to that of the control sequence with iCP and those which had an increased amount of OVA were considered to be valid hits. Of the nine total hits, six validated successfully. Additionally, all validated hits had at least 1.4-fold selectivity for the iCP (FIG. 4C and FIG. 5). We chose to move forward with the sequence Ala-Thr-Met-Trp, as this not only had highly efficient cleavage by the iCP but also was close to 5-fold selective for the iCP compared to the sCP.

Rhodamine 110 (Rh110) has several improved qualities over AMC that lead us to select it as the fluorophore in our probe. First, Rh110 has higher stability in biologically-relevant buffers and media, making it more ideal for cell based assays. Additionally, its greater fluorescence sensitivity compared to AMC allows for the use of a lower concentration of probes to achieve the same signal. Finally, current AMC-based probes suffer greatly from poor cell permeability and significant quantities (high micromolar range), limiting their effectiveness as real-time tools.[22] With its diamine structure, Rh110 contains two handles for modification, allowing us to further optimize the properties of our probes for improved cellular uptake.

Our probe design includes the sequence of our top hit conjugated to Rh110 with a peptoid fragment for cell permeability on the opposite side. This probe, referred to here as TBZ1, was synthesized on a Rink amide resin using standard peptoid and peptide synthesis. Following the peptoid, Fmoc-glycine and succinic acid were subsequently coupled, providing the terminal acid group necessary for conjugating Rh110. The terminal acid was first activated with 1 eq of COMU then incubated at 60° C. for three hours with 10 eq of Rh110 chloride, 20 eq DIPEA and 20 eq Proton Sponge, which was added to provide improved deprotonation of the aromatic amine.[37] This reaction was followed by coupling of Fmoc-Trp(boc)-OH to the second aromatic amine, using 10 eq of amino acid, 10 eq COMU, 20 eq DIPEA and 20 eq Proton Sponge for three hours at 60° C. The succeeding amino acids were coupled using 6 eq with 6 eq COMU and 12 eq DIPEA for one hour at 37° C. Each coupling was repeated a second time under these same conditions to ensure efficient coupling. The final probe was subjected to TFA cleavage and purified using RP-HPLC to at least 95% purity. In addition to our top hit sequence, we synthesized several controls in the same manner. This includes a negative hit from the screen as well as structures replacing either the peptide or peptoid segment. These structures can be found in Scheme 1.

Scheme 1. Syntheis of Rh-Based Probes*

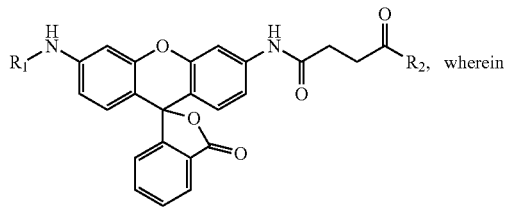

| Name | $R_1=$ | $R_2=$ |
|---|---|---|
| TBZ1 | Ala-Thr-Met-Trp | Peptoid |
| TBZ2 | Ala-Glu-Pro-Tyr | Peptoid |
| TBZ3 | Acetyl | Peptoid |
| TBZ4 | Ala-Thr-Met-Trp | H |

Figure 6:
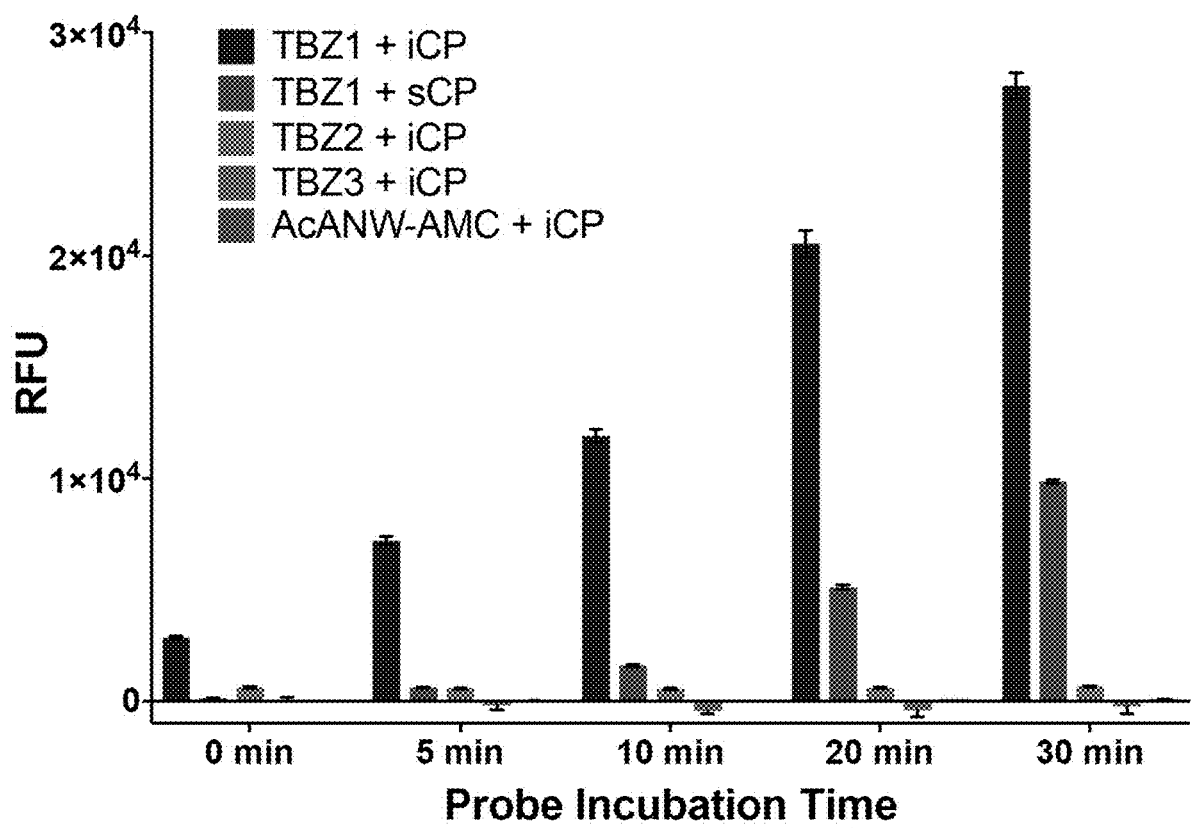
FIG. 6. Probes (31 μM) were mixed with iCP (9 nM) or sCP (9 nM) in tris HCl buffer (50 mM, pH 7.6, 50 μL). Samples were incubated at 37 C. while monitoring the change in fluorescence (ex—485(20) nm, em—535(20) nm). Each point plotted is an average of triplicates at each time point.
Figure 11A:
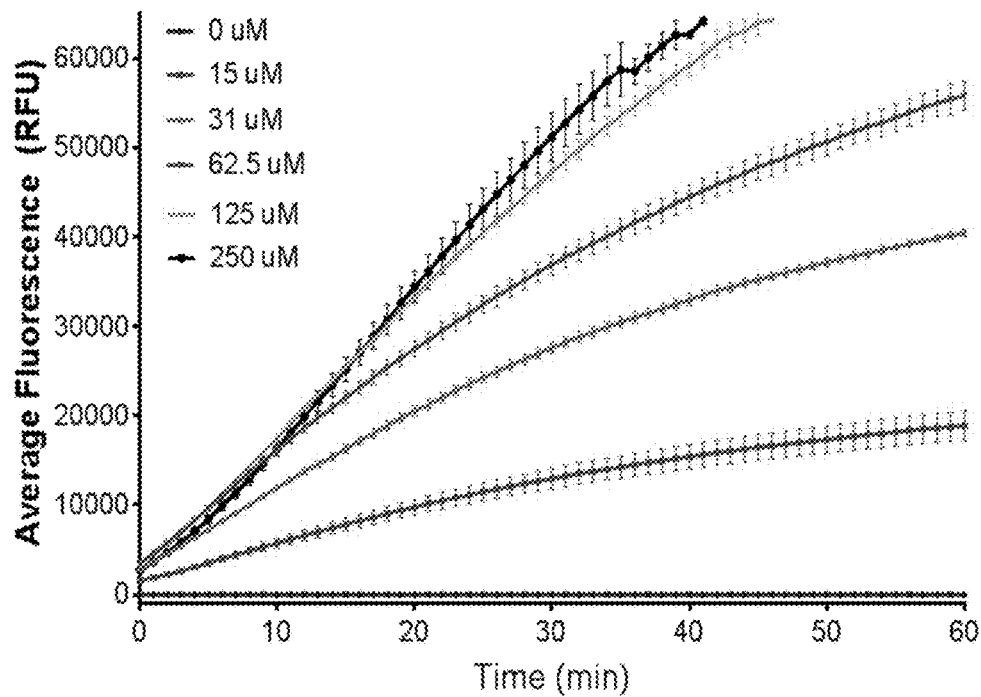
FIGS. 11A-11B. Kinetic traces for various concentrations of TBZ1 with 9 nM of FIG. 11A: iCP
Figure 11B:
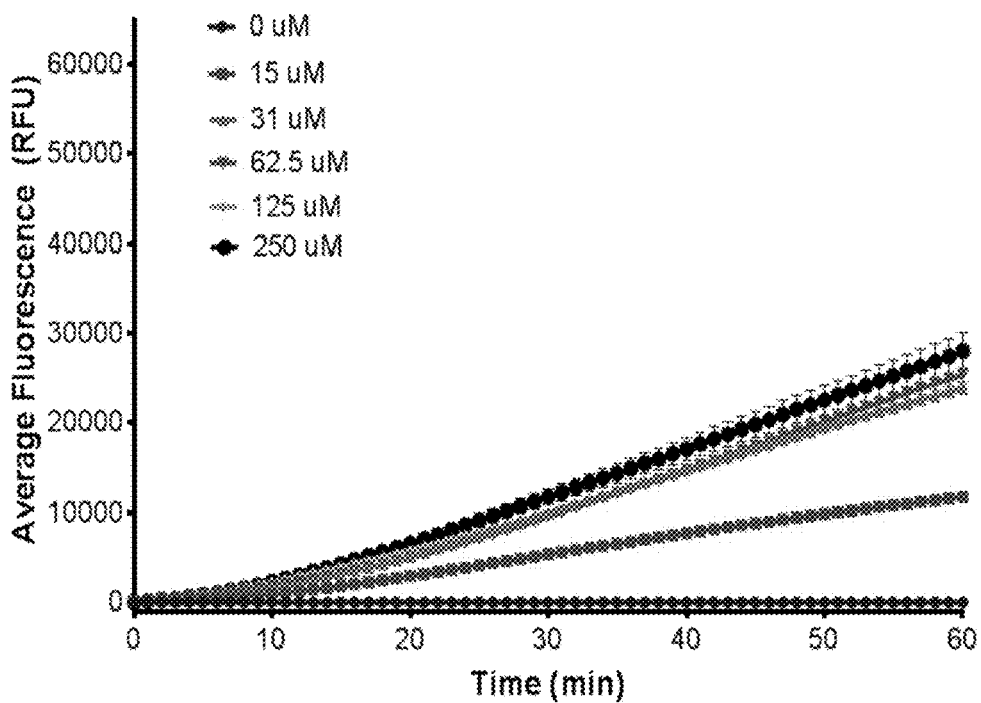

Initially, we treated various concentrations of TBZ1 from 0-250 µM with both the iCP and sCP (FIG. 11). All concentrations were incubated at 37° C. with 9 nM of the respective proteasomes and the increase in fluorescence was monitored for 60 min at 1 min intervals. We found 31 µM of TBZ1 to give a favorable profile, maintaining about a 3:1 selectivity compared to the sCP (FIG. 6).

Figure 12A:
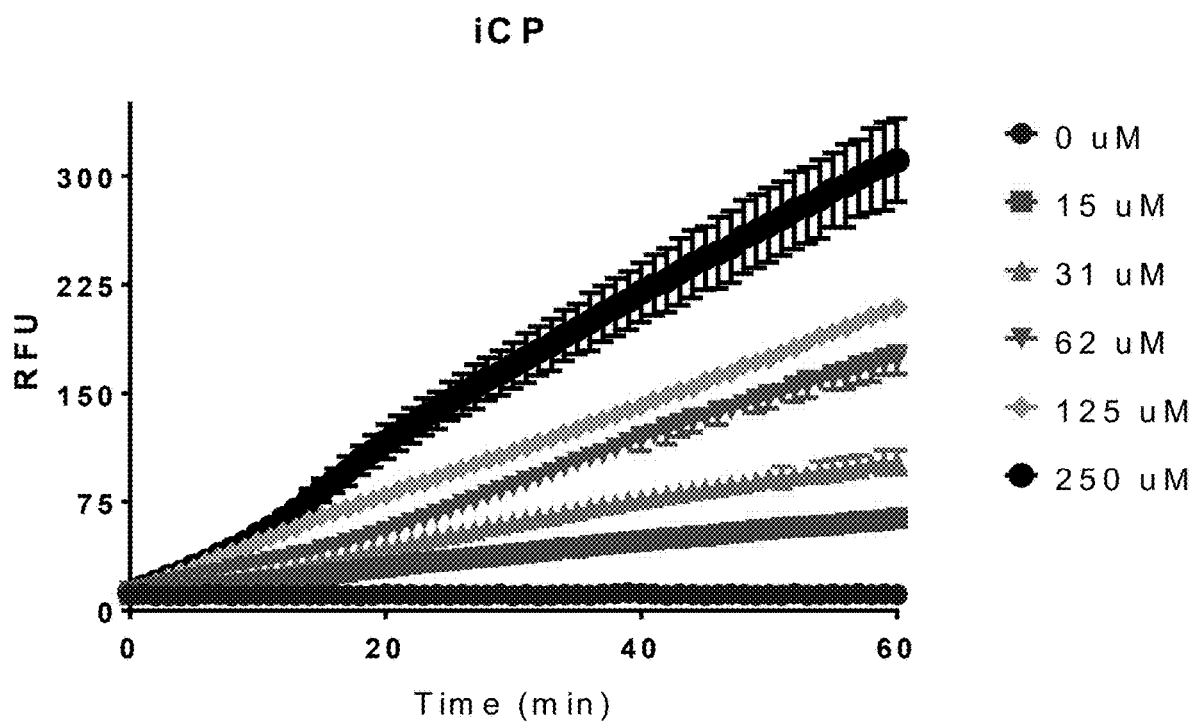
FIGS. 12A-12B. Kinetic traces for various concentrations of Ac-ANW-AMC with 9 nM of FIG. 12A: iCP
Figure 12B:
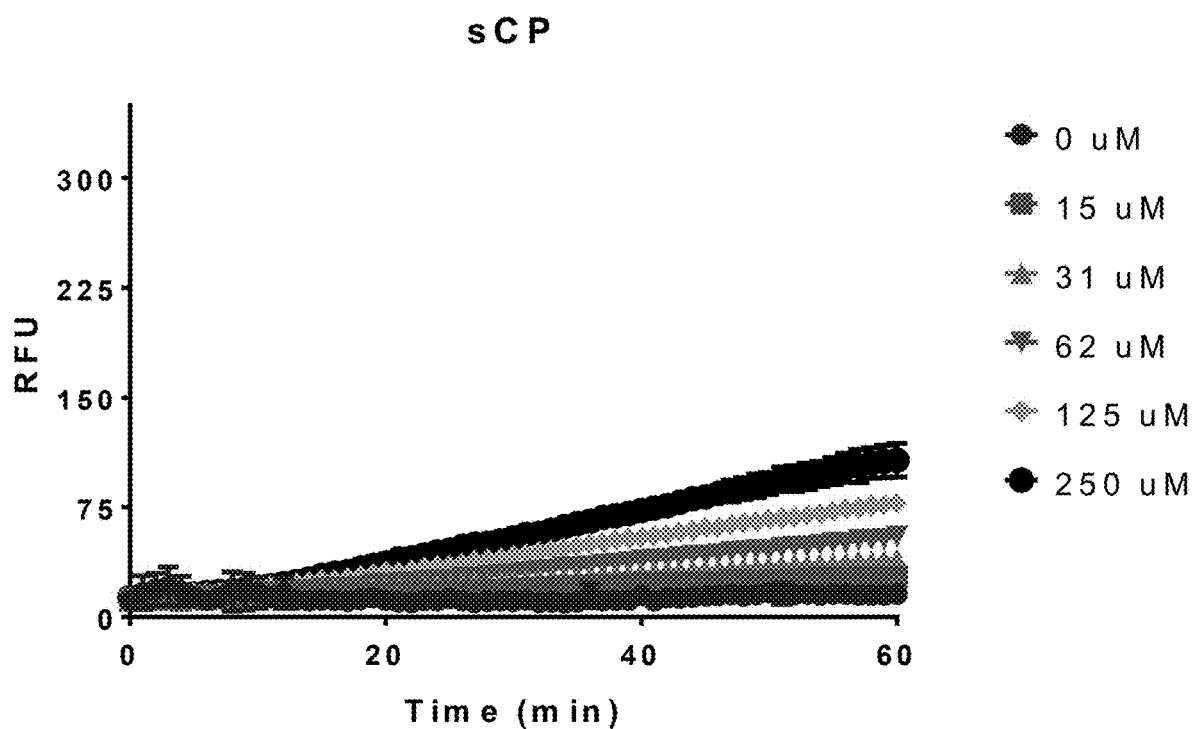

The remaining probes were studied at 31 µM and monitored for an increase in fluorescence over 30 minutes. A summary of this data is provided in FIG. 6. TBZ3, with the peptide sequence replaced with an acetyl group, does not result in any significant change in fluorescence. This suggests that the increase in fluorescence observed for TBZ1 is only a result of cleavage at the peptide structure and not the peptoid. Additionally, very minimal fluorescence is observed with TBZ2, which contains the peptide sequence of a negative hit, confirming that changes in fluorescence are dependent on peptide sequence. Finally, we also sought to compare TBZ1 to the commercially available, iCP-selective substrate probe Ac-ANW-AMC. Under the same assay conditions, we found Ac-ANW-AMC to have very little change in fluorescence compared to TBZ1. Increasing the concentration of Ac-ANW-AMC still did not result in a similar intensity as TBZ1 (FIG. 12).

To further confirm these results are due to cleavage specifically between our peptide and Rh and is selective for iCP cleavage, we analyzed TBZ1 samples by LC/MS (FIG. 7) with purified enzymes. We first analyzed TBZ1 in the same conditions as the biochemical assay without any iCP to confirm there was not any non-specific degradation occurring during the LC/MS run. In this, we only observed the two isomers of our probe. After treatment with the iCP, we observed two new peaks in the TIC spectrum. These corresponded to the expected Rh-peptoid and peptide fragments. The full mass of TBZ1 was extracted from each triplicate and compared between iCP and sCP samples. From this, we found that only 31% of uncleaved TBZ1 remained in iCP samples. When this analysis was performed using sCP, we observed that 77% remained uncleaved.

Figure 8A:
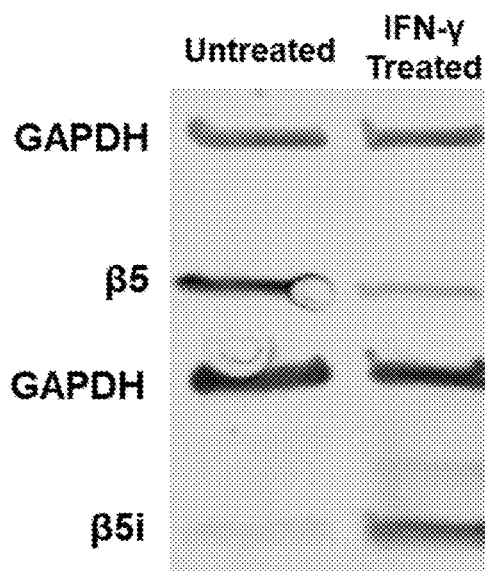
FIG. 8A. Western blot analysis of A549 cells after treatment with 5 ng/mL human IFN-γ. Compared to untreated cells, samples treated with IFN-γ showed an increase in β5i, demonstrating the increase in expression of the iCP. Note—though both Western blots were from identical samples, intensity of the GAPDH band appears higher in the β5i blot as the required secondary antibody for β5i is anti-goat, the host animal of the secondary antibody for GAPDH.
Figure 8B:
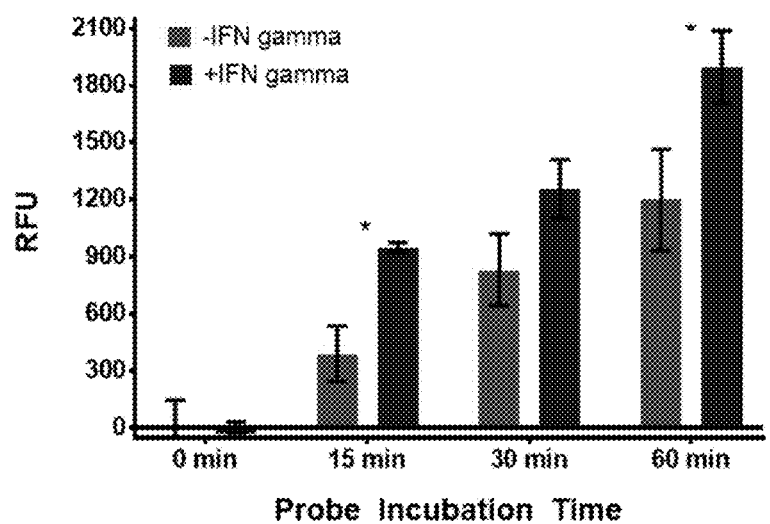
FIG. 8B. Untreated and IFN-γ treated A549 cells were dosed with 31 μM TBZ1 and incubated for various times. Fluorescence measurements showed a significant increase in the cleavage of TBZ1 in IFN-γ treated cells compared to untreated.

It has been well documented that treatment of cultured cells with IFN-γ induces the expression of the three catalytic subunits, β1i, β2i and β5i, necessary to form the iCP, along with various other proteins involved in communication with the immune system.[6,8,38-40] We sought to use IFN-γ treatment as a way to established cell culture conditions for an iCP-expressing cell line. Initially, we tested A549 cells, a lung carcinoma. A549 has been demonstrated to express the immunoproteasome, though in varying degrees under different conditions.[41,42] Cells were treated with 5 ng/mL IFN-γ each day for four days then analyzed by Western blot, staining separately for β5 and β5i (FIG. 8A). In addition to being interested in the protein levels of β5i since it was the designed target of TBZ1, incorporation of β5 i during the assembly of the iCP occurs before that of β1i or β2i, suggesting that it is one of the necessary triggers for the formation of iCPs.[25,43] Therefore, β5i is considered a good indicator of the presence of the iCP. Untreated A549 cells showed little to no β5i, offering a good negative control for later studies. After IFN-γ treatment, decreased expression of β5 was observed with a corresponding increase in β5i. These conditions are reproducible (FIG. 13) and representative of those used for subsequent live cell experiments.

Figure 14:
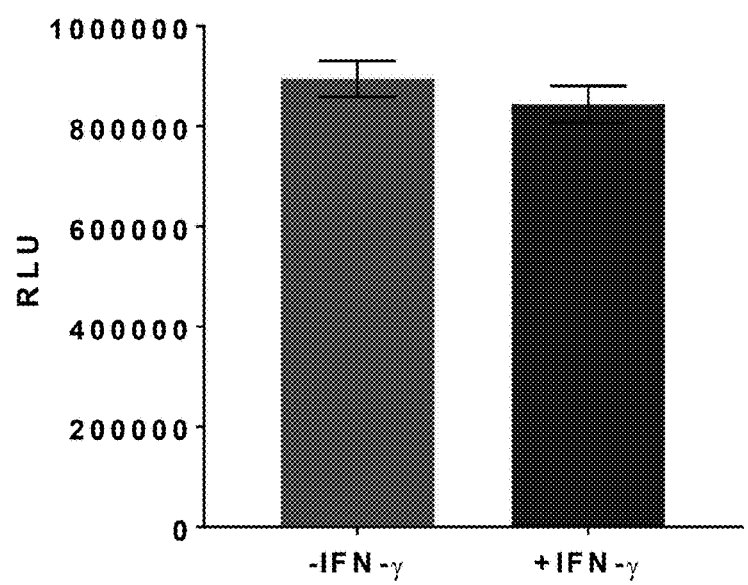
FIG. 14. A Cell Titer-Glo® luminescent cell viability assay was performed on A549 cells after treatment with TBZ1 to ensure cell counts for untreated and IFN-γ treated cells were consistent and that TBZ1 was not toxic to cells.
Figure 15:
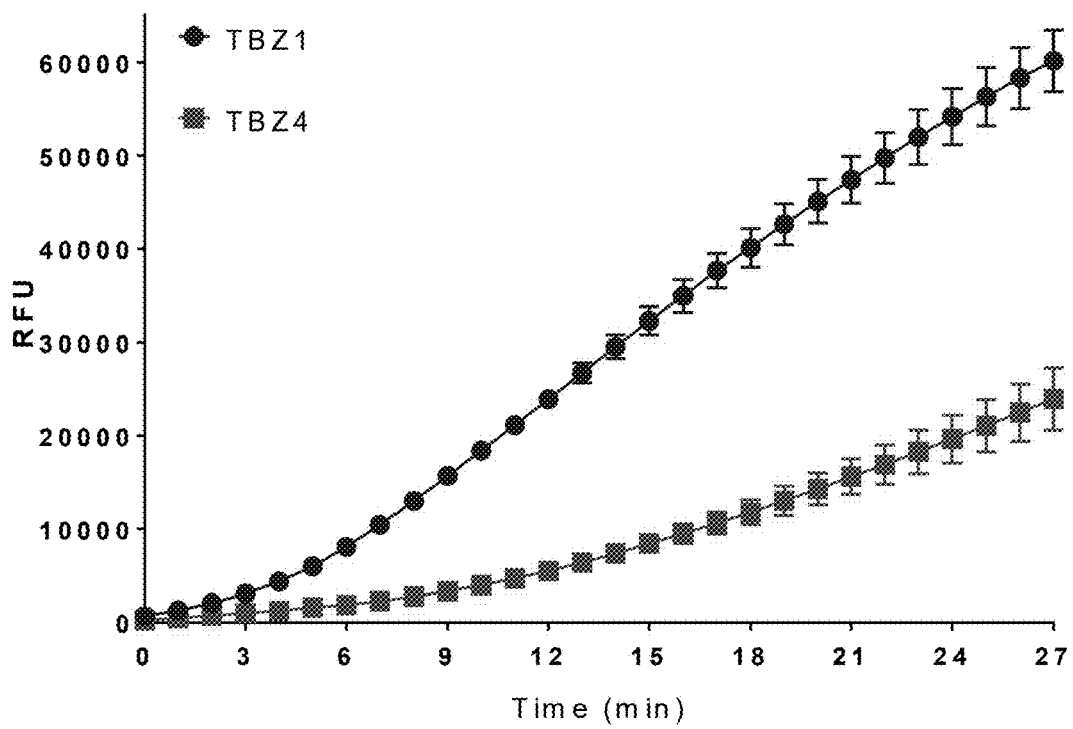
FIG. 15. Kinetic traces for 31 μM TBZ1 and TBZ4 with 9 nM of iCP.

To determine the selectivity of TBZ1 in cells, both untreated cells and cells treated with IFN-γ were plated at the same cell density into a 96-well plate for fluorescence readouts. After allowing sufficient time for the cells to adhere to the wells, TBZ1 was added and allowed to incubate for various time points. Following the initial incubation, wells were washed with PBS to remove any probe that had not been taken up by the cells and the plate was incubated for an additional hour before the fluorescence was recorded. This data showed significantly increased signal for IFN-γ treated cells at 15 and 60 min compared to regular A549 cells. To confirm that this difference was not due to a difference in cell density, we used Cell Titer-Glo™ (Promega) to measure cell viability, which showed no significant difference between untreated and IFN-γ treated A549 cells plated in parallel with the fluorescence experiment (FIG. 14). We initially intended to use TBZ4 as a way to confirm that the addition of a peptoid improved cell penetration and protease stability of TBZ1. However, TBZ4 was not as efficiently cleaved at TBZ1 when used with purified iCP (FIG. 15). Therefore, TBZ4 was not included in cell-based studies, as it would be difficult to determine if a decrease in cell labeling was due to poor cell permeability or less efficient cleaving when inside the cell.

Figure 8C:
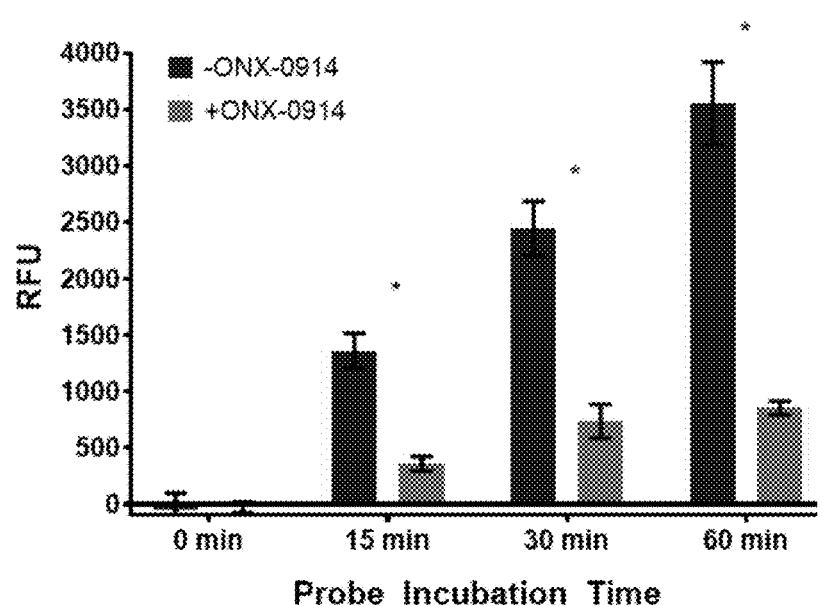
FIG. 8C. When IFN-γ treated A549 cells are dosed with ONX-0914, a significant decrease in TBZ1 cleavage is observed, demonstrating its selectivity for iCP cleavage in cells. Confocal microscopy was used to demonstrate the intracellular localization of the fluorescence. IFN-γ treated cells were dosed with TBZ1 at 31 μM or DMSO for 60 min. The cells were stained with Super Bright 436 HLA-ABC monoclonal antibody to stain the plasma membrane. These images demonstrate that the green fluorescence observed in TBZ1-treated cells is localized inside the cell.
Figure 16:
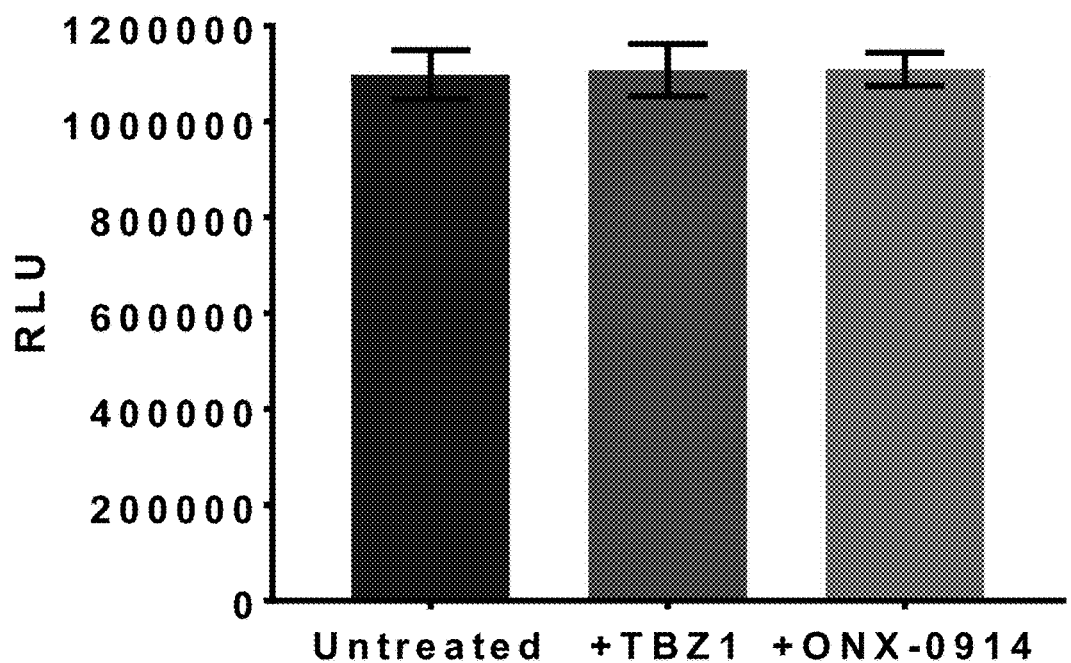
FIG. 16. A Cell Titer-Glo® luminescent cell viability assay was performed on A549 cells after treatment with TBZ1 to ensure cell counts for untreated and IFN-γ treated cells were consistent and that the concentration of ONX-0914 did not cause any significant cell death during the duration of the experiment.

We wanted to further demonstrate the selectivity of TBZ1 over other cellular proteases in cells and highlight its ability to effectively enter cells. To achieve this, we dosed IFN-γ treated cells with a non-lethal concentration of ONX-0914, a β5i-specific inhibitor,[44] for 30 min before performing TBZ1 dosing. This data showed a significant increase in fluorescence at all time points tested (FIG. 8C). Performing Cell Titer-Glo showed this decrease in signal was not due to cell death caused by iCP-inhibition (FIG. 16).

As an additional way to visualize the cells treated with TBZ1, we analyzed IFN-γ cells using confocal microscopy. Following a similar procedure as the plate reader assay, IFN-γ treated cells were plated on glass coverslip chambers coated with poly-D-lysine and were dosed with TBZ1 (31 µM) or DMSO for one hour. After washing, the cells were returned to the incubator for 30 min before staining with Super Bright 436 HLA-A, B, C antibody to serve as a membrane marker. Compared to cells treated with DMSO, those treated with TBZ1 show increased staining due to probe cleavage within the cell. Very little background fluorescence is observed outside of the cell, suggesting that the fluorescence change observed is due to intracellular cleavage by the iCP rather than outside the cell by other proteases.

Figure 9:
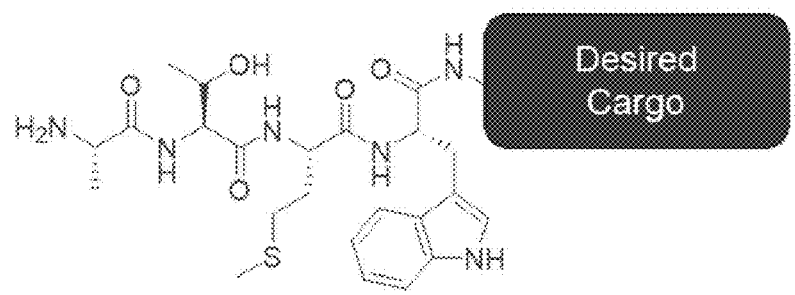
FIG. 9. This image shows the chemical structure of the immunoproteasome recognition molecule (purple) attached to a generic cargo molecule (blue). In the claims for application 68454-01, this molecule is referred to as (I) with the generic cargo shown as R1. Desired Cargo=any range of small molecules which can be covalently attached to the peptide immunoproteasome recognition sequence.

FIG. 9 shows an image of the chemical structure of the immunoproteasome recognition molecule (purple) attached to a generic cargo molecule (blue). In the claims for application 68454-01, this molecule is referred to as (I) with the generic cargo shown as R1. Desired Cargo=any range of small molecules which can be covalently attached to the peptide immunoproteasome recognition sequence.

Figure 10:
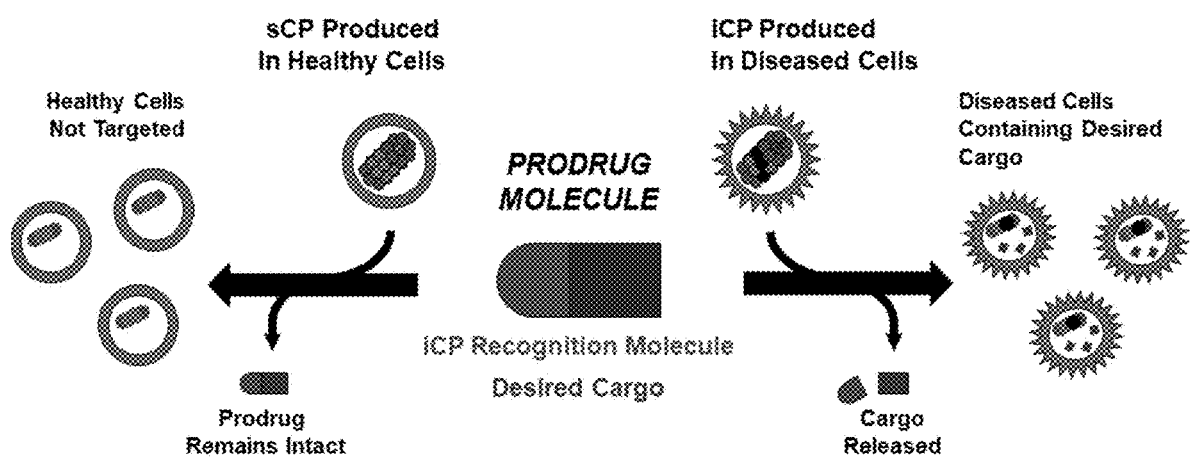
FIG. 10. The image above illustrates the general goal of our prodrug delivery system. The immunoproteasome recognition molecule (purple) is covalently attached to the desired cargo (blue) and provided to the cells. Since the recognition molecule is selective for immunoproteasomes, it will only release the cargo inside the diseased cells observed to express the immunoproteasome. In healthy cells, which express the standard proteasome, the prodrug molecule remains intact. Desired Cargo=any range of small molecules which can be covalently attached to the peptide immunoproteasome recognition sequence.

For FIG. 10, the image above illustrates the general goal of our prodrug delivery system. The immunoproteasome recognition molecule (purple) is covalently attached to the desired cargo (blue) and provided to the cells. Since the recognition molecule is selective for immunoproteasomes, it will only release the cargo inside the diseased cells observed to express the immunoproteasome. In healthy cells, which express the standard proteasome, the prodrug molecule remains intact. Desired Cargo=any range of small molecules which can be covalently attached to the peptide immunoproteasome recognition sequence.

To conclude, we have discovered several short peptide sequences which, when incorporated into a larger structure, allow for specific cleavage by the immunoproteasome. This was accomplished by screening a library thoughtfully designed to exploit the differences between the iCP and sCP binding pockets. These sequences are not only efficiently cleaved by the iCP, but were also observed to be modestly selective over the sCP without any further optimization. Of these, we chose to move forward with our top hit (Thr-Met-Trp) for further development as a fluorogenic probe.

When designing our probe, we kept in consideration the pitfalls of current commercially available proteasome activity probes (FIGS. 2A and 2B). Namely, these are the lack of sensitivity of the fluorophore (aminomethylcoumarin) requiring the use of high concentrations in assays and the probes' poor cell permeability limiting live cell studies. To improve upon the former, we incorporated rhodamine 110 (Rh110) into our probe structure. In published literature, Rh110 has been used in protease substrates, typically including the same recognition peptide attached to both amines.[45,46] However, as our sequence was observed to be efficiently cleaved, we chose to use one amine as a handle to incorporate a structure to improve cell permeability. Including a peptoid structure is known to increase cell permeability while also being resistant to proteolytic cleavage. This design strategy resulted in our final probe structure, named TBZ1 (Scheme 1).

Figure 7:
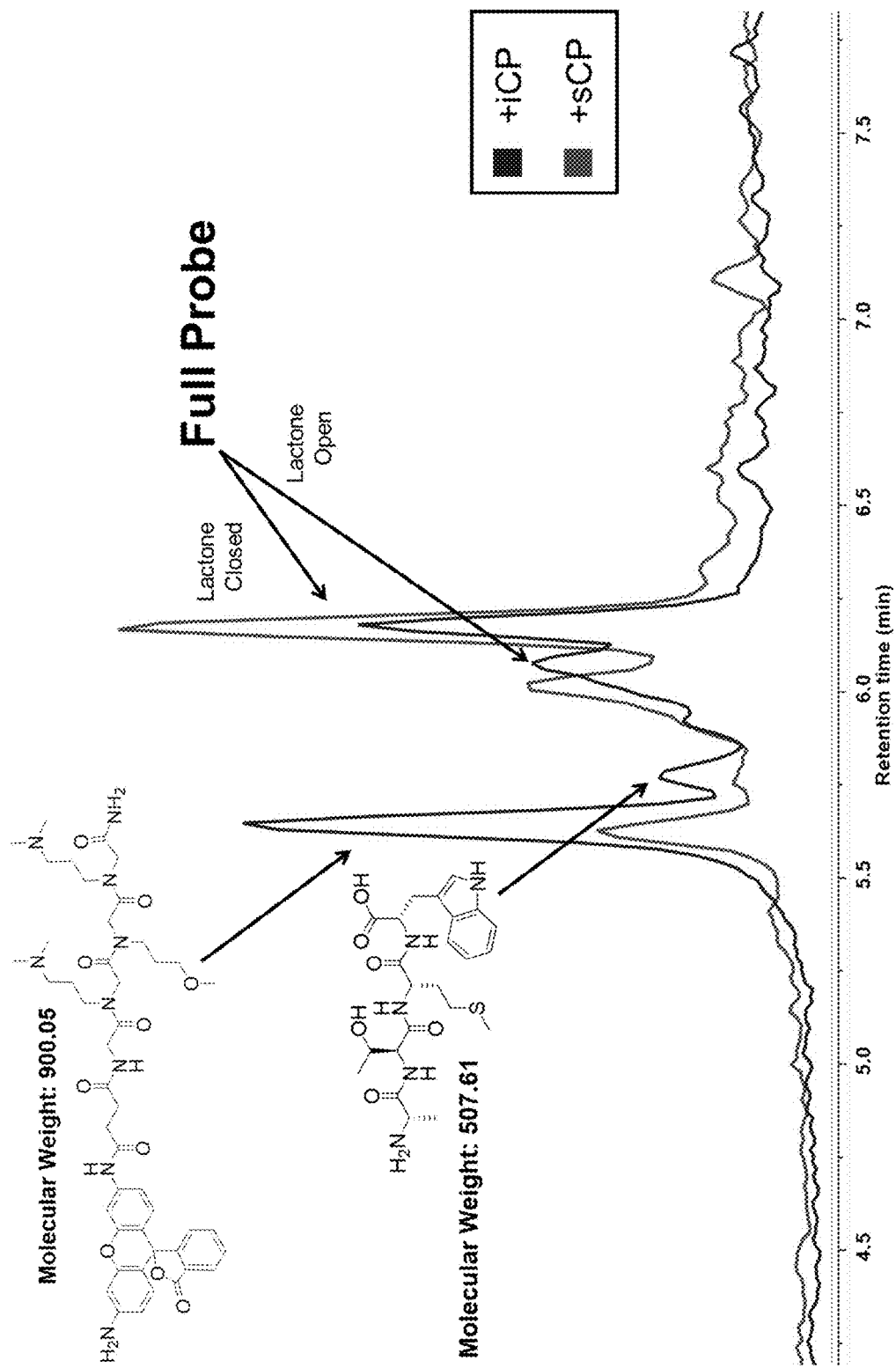
FIG. 7. TBZ1 (31 μM) was incubated with 9 nM iCP of sCP for 55 min at 37° C. then quenched with acetonitrile. The samples were analyzed by LC/MS. The sample treated with iCP (TIC blue trace) showed significant cleavage of TBZ1 at the desired location between the rhodamine moiety and the peptide. The sCP sample (TIC red trace) had more uncleaved probe as indicated by the larger peak at 6.3 min.

When used in biochemical assays, we found TBZ1 to maintain the selectivity observed in the original peptide used in hit validation (FIG. 6, blue and red bars). Additionally, as expected, when used under the same assay conditions, the fluorescence signal of the commercially available iCP probe is barely above baseline (FIG. 6, purple bars). Even at the highest tested concentration of Ac-ANW-AMC (250 µM), the signal is still two-orders of magnitude lower than TBZ1 (FIGS. 11 and 12). With the synthesis of various controls (TBZ2 and 3), we were able to demonstrate that the cleavage observed with TBZ1 is peptide sequence dependent and that no cleavage occurs between the rhodamine and the peptoid. This is further supported by LC/MS analysis of TBZ1 incubated with iCP, showing only the production of the expected products (FIG. 7).

We moved forward to demonstrate the ability of TBZ1 to be used with live cells, while still maintaining the selectivity observed in the biochemical assays. Furthermore, the observed signal can be significantly decreased when cells are dosed with ONX-0914, a iCP-selective inhibitor,[44] at a non-lethal dose. This reveals that TBZ1 is not only selective for the iCP over the sCP but also over other cellular proteases. Importantly, this data along with confocal microscopy analysis demonstrates the utility of TBZ1 with live cells, a critical characteristic for monitoring the activity of the iCP in real time. This will also be beneficial for the use of TBZ1 in more high-throughput applications, as it simplifies sample preparation because cells do not need to be fixed and permeabilized.

TBZ1 has great potential in several different applications. First, with its ability to quickly label iCP-expressing cells, it can serve as a useful diagnostic tool. Expression of the iCP is observed in several autoimmune diseases and cancers, and the effective staining of these types of cells using TBZ1 would allow for their identification in a mixed population. To this end, we have preliminary flow cytometry data (FIG. 17) which suggests cell populations can be separated based on increasing amounts of iCP-expressing cells. Along this same line, TBZ1 could be used in cell culture to improve our understanding of the expression of the iCP, including how quickly it begins to be active after exposure to inflammatory cytokines and how distant from the point of INF-γ exposure cells with iCP can be observed.

Another potential application for TBZ1 is as a tool for molecule discovery. Having a probe to monitor iCP activity in cells allows for real time observation of the effect various molecules may have. However, the use of TBZ1 would not be limited to investigation of inhibitors. With its great sensitivity, lower concentrations of TBZ1 could be used to monitor increases in iCP activity as well.

Overall, we have discovered a peptide sequence which can be selectively cleaved by the iCP and demonstrated its use in a fluorogenic substrate probe. This probe has shown usability in live cells, offering a broad scope of potential applications in the future.

General Methods and Materials

All chemicals were obtained from Sigma-Aldrich, Acros Organic, Alfa Aesar or Fisher Scientific and used as received without any further purification. Solid-phase peptide synthesis reactions were performed in fritted syringes (purchased from Henke Sass Wolfe). Resin was purchased from Chem-Impex Int'l INC. Purified proteasomes were purchased from Boston Biochem.

Library and Screening Hit Synthesis

Fmoc-Leu-OH Wang resin (0.745 mmol/g, 0.081 mmol) was swelled in DMF (5 mL) for 1 hour. The Fmoc deprotections were performed with 20% piperidine (3×5 min) to yield a positive Kaiser test. OVA was first loaded onto the resin, using 5 eq of each amino acid, 4.75 eq HBTU and 10 eq DIPEA. For library synthesis, the resin was Fmoc deprotected, washed with DMF then split into seven even fractions. Each fraction was coupled with a different amino acid, using 5 eq of amino acid, 4.75 eq HBTU and DIPEA in DMF for 1 hour, and checked for completion by Kaiser test. When all fractions showed negative Kaiser tests, they were recombined and the process was repeated. Positions 2 and 3 were performed at 37° C. Any residues that were found to not have a negative Kaiser test after one hour of coupling was repeated using fresh reagents. After position 3, Fmoc-Ala-OH was coupled to the entire library. The final Fmoc was removed and the resin was dried and stored at 4° C.

For quality control of the library, 24 beads were removed and separated into single wells of a 96 well plate. Peptides were cleaved with 100 µL of 95% TFA, 2.5% DCM, 2.5% TIPS for two hours. The samples were dried under vacuum, washed once with 200 µL methanol and dried again. Each sample was dissolved in MALDI matrix (CHCA, 10 mg/mL in 50% acetonitrile with 0.1% TFA, 7 µL) and spotted on a MALDI plate for analysis (SciEx 4800 MALDI TOF/TOF MS).

To synthesize hits for validation, Wang resin preloaded with OVA (0.015 mmol) was further extended with the desired prodrug leader sequence. After final Fmoc removal, the resin was dried and cleaved with 95% TFA, 2.5% DCM, 2.5% TIPS for two hours. The product was precipitated with diethyl ether and the pellet was dried under vacuum. Purification was performed on an Agilent HPLC (Agilent Technologies 1200 Series), using a reversed phase column (Agilent Eclipse XDB-C18). Samples were detected using a UV lamp, looking specifically at 254 nm and 210 nm wavelengths. After purification, samples were freeze dried using a ModulyoD lyophilizer (purchased from Savant Instruments, Inc.). All samples had ≥95% purity. Leader sequences, calculated and found masses can be seen is Table 2.

TABLE 1

The mass of OVA was extracted from each sample. All hits synthesized were in the top 25% of samples based on the amount of OVA extracted. Shown in the table are hits synthesized for validation.

| $P_3$-$P_2$-$P_1$ | iCP % Change OVA | sCP % Change OVA | Selectivity |
| --- | --- | --- | --- |
| Ala-Ala-Phe | 0 | −25 | 1.3 |
| Thr-Met-Trp | +1502 | +232 | 4.8 |
| His-Phg-Phe | +619 | +144 | 3.0 |

TABLE 1-continued

The mass of OVA was extracted from each sample. All hits synthesized were in the top 25% of samples based on the amount of OVA extracted. Shown in the table are hits synthesized for validation.

| $P_3$-$P_2$-$P_1$ | iCP % Change OVA | sCP % Change OVA | Selectivity |
|---|---|---|---|
| His-Ala-Trp | +388 | +130 | 2.1 |
| Thr-Ala-Trp | +297 | +110 | 1.9 |
| His-Ala-Val | +160 | +79 | 1.5 |
| His-Ala-Phe | +75 | +26 | 1.4 |
| Glu-Pro-Leu | −91 | −93 | 1.4 |
| Asp-Cys-Tyr | −83 | −71 | 0.6 |
| Ser-Gly-Tyr | −52 | −46 | 0.9 |
| Gln-Abu-Cha | 6 | −27 | 1.5 |
| His-Gly-Gly | −82 | −78 | 0.8 |
| Glu-Pro-Tyr | −89 | −63 | 0.3 |

TABLE 2

Characterization of Peptides Synthesized for Hit Validation

| $P_3$-$P_2$-$P_1$ | Calculated Mass | Found Mass |
|---|---|---|
| Ala-Ala-Phe | 1246.7 | 1247.7 $[M + H]^+$ |
| | | 624.4 $[M + 2H]^{2+}$ |
| Thr-Met-Trp | 1375.7 | 1376.7 $[M + H]^+$ |
| | | 688.9 $[M + 2H]^{2+}$ |
| His-Phg-Phe | 1374.7 | 1375.7 $[M + H]^+$ |
| | | 688.4 $[M + 2H]^{2+}$ |
| His-Ala-Trp | 1351.7 | 1352.7 $[M + H]^+$ |
| | | 676.9 $[M + 2H]^{2+}$ |
| Thr-Ala-Trp | 1315.7 | 1316.7 $[M + H]^+$ |
| | | 658.9 $[M + 2H]^{2+}$ |
| His-Ala-Val | 1264.7 | 1265.7 $[M + H]^+$ |
| | | 633.4 $[M + 2H]^{2+}$ |
| His-Ala-Phe | 1312.7 | 1313.7 $[M + H]^+$ |
| | | 657.4 $[M + 2H]^{2+}$ |
| Glu-Pro-Leu | 1296.7 | 1297.7 $[M + H]^+$ |
| | | 649.4 $[M + 2H]^{2+}$ |
| Asp-Cys-Tyr | 1338.7 | 1339.2 $[M + H]^+$ |
| | | 670.1 $[M + 2H]^{2+}$ |
| Ser-Gly-Tyr | 1264.7 | 1265.7 $[M + H]^+$ |
| | | 688.4 $[M + 2H]^{2+}$ |
| Gln-Abu-Cha | 1323.8 | 1324.8 $[M + H]^+$ |
| | | 662.9 $[M + 2H]^{2+}$ |
| His-Gly-Gly | 1208.7 | 1209.7 $[M + H]^+$ |
| | | 605.3 $[M + 2H]^{2+}$ |
| Glu-Pro-Tyr | 1346.7 | 1347.7 $[M + H]^+$ |
| | | 674.4 $[M + 2H]^{2+}$ |

TABLE 3

Distribution of Each Amino Acid in Top Hits

| | Phe | Trp | Tyr | Gly | Cha | Leu | Val |
|---|---|---|---|---|---|---|---|
| % P1 | 13.8 | 11.1 | 23.3 | 5.3 | 8.5 | 15.9 | 22.2 |

| | Gly | Cys | Met | Pro | Aib | Phg | Ala |
|---|---|---|---|---|---|---|---|
| % P2 | 17.6 | 7.4 | 7.4 | 11.7 | 20.2 | 13.2 | 22.3 |

| | Asn | Asp | Gln | Glu | His | Ser | Thr |
|---|---|---|---|---|---|---|---|
| % P3 | 11.5 | 12.6 | 15.2 | 14.1 | 18.3 | 11.5 | 16.8 |

Library Screening with iCP and Validation

Individual beads were split into the wells of a 96 well plate. To cleave from resin, 100 µL of 95% TFA, 2.5% DCM and 2.5% TIPS was added to each well. The plate was left uncovered and agitated for 1 hour. An additional 50 µL of cleavage cocktail was added to each well and the plate was agitated for another hour. The solvent was removed using the speed vac. After drying, methanol was added and removed on the speed vac two times to remove any residual TFA. The plate was sealed and stored at 4° C. until used for screening.

Each peptide was resuspended in 46 µL of 50 mM tris HCl buffer, pH 7.6. To each well, 4 µL of 50 nM stock iCP in tris HCl buffer was added to reach a final iCP concentration of 4 nM. The plate was placed in an incubator at 37° C. for 6 hours. After incubation, 50 µL of HPLC-grade acetonitrile was added to each sample to quench the proteasome. This was removed using the speed vac and dried samples were resuspended in 100 µL 50/50 water/acetonitrile with 0.1% formic acid. Each sample was then analyzed by LC/MS (Shimadzu HPLC connected to AB SCIEX QTRAP 4500) with an injection volume of 90 µL.

To rank hits, the mass of OVA (887.0-887.9) was extracted. The peak at the same time point as the standard (4.2-4.4 min) was then integrated. Sequences considered for validation had peaks integrated to at least $9 \times 10^5$ integrated EIC. Based on the mass found for the whole (uncleaved) peptide, possible sequences were identified. The occurrence of each amino acid was counted and those amino acids found most often at each position (Table 2) were favored when selecting sequences to make for validation.

For validation, purified hit sequences (46 µL final concentration 5.2 µM) in 50 mM tris buffer, pH 7.6 were added to nine wells of a 96 well plate. To each triplicate, 4 µL of tris buffer, 50 nM iCP (final concentration 4 nM) or 50 nM sCP (final concentration 4 nM) was added. This was sealed and allowed to incubate for 6 hours at 37° C. HPLC-grade acetonitrile (50 µL) was added to each sample and the samples were then dried under vacuum. Dried samples were resuspended in 100 µL 50/50 water/acetonitrile with 0.1% formic acid. Each sample was then analyzed by LC/MS with an injection volume of 90 µL. The mass of OVA (887.0-887.9) was extracted. The peak at the same time point as the standard was then integrated and averaged over the triplicate for each sample. Percent change was considered for each triplicate in comparison to the EIC of the control peptide sequence (Ala-Ala-Ala-Phe-OVA). Raw data for integrated OVA peaks can be seen in FIG. 5. Each bar represents an average of triplicates with error bars given as the standard deviation.

Rhodamine Probe Synthesis

LS rink amide resin (0.3 mmol/g) was swelled for 30 min in 50/50 DMF/DCM. The Fmoc was removed using 20% piperidine in DMF (3×5 min) to yield a positive Kaiser test. After deprotection, the resin was washed with anhydrous DMF. For bromoacetic acid coupling, 1 M DIC and 2 M bromoacetic acid in anhydrous DMF were mixed 1:1 and agitated until a precipitate was observed. This was then added to the resin and allowed to agitate for 20 min at 37° C. The solution was removed and the resin was washed with anhydrous DMF before a 1 M solution of the corresponding amine was added. This was agitated for 1 hour at 37° C. then washed with anhydrous DMF. Completion of coupling was monitored using the chloranil test for secondary amines. After completion of the peptoid sequences, Fmoc-Gly-OH (4 eq) was coupled with HBTU (3.75 eq) and DIPEA (8 eq) in anhydrous DMF for 3.5 hours at 37° C. Completion of the coupling was confirmed by a negative chloranil test and the Fmoc was then deprotected. To couple the succinamide group, succinic anhydride (10 eq) and pyridine (12 eq) were dissolved in anhydrous DCM with 10% DMF. This was added to the resin and allowed to agitate at room temperature overnight. Successful coupling was confirmed with a negative Kaiser test. For rhodamine coupling, the resin was first washed with a solution of 1,8-bis(dimethylamino)-naphthalene (20 eq) and DIPEA (20 eq) in DMF. COMU (1 eq) was dissolved in DMF with 1,8-bis(dimethylamino)naphthalene (20 eq) and DIPEA (20 eq) and added to the resin. This was allowed to agitate for 5 min at room temperature to activate the carboxylic acid on the resin. To this solution was then added rhodamine 110 chloride (10 eq) dissolved in DMF. This was agitated for 3 hours at 60° C. The first amino acid was coupled using similar conditions, but the amino acid (10 eq) was activated with COMU (10 eq) then added to the resin. Fmoc deprotection was performed using 20% piperidine for 30 min at 37° C. Subsequent residues were coupled using 6 eq amino acid, 6 eq COMU and 12 eq DIPEA in DMF for 1 hour at 37° C. This was repeated with fresh reagents of each residue before Fmoc deprotection and moving on to the next amino acid. After the final Fmoc was removed, the resin was washed with DCM and dried. For resin cleavage and side chain group deprotection, the resin was suspended in 95% TFA, 2.5% DCM, 2.5% TIPS for 2 hours. Ether precipitation showed to reduce yield, so after evaporating the cleavage cocktail, the crude mixture was directly dissolved in water/acetonitrile for HPLC purification (Agilent 1260 Infinity system, Eclipse Plus C18 5 μm, 4.6×150 mm column). Identity and purity of each probe was confirmed by LC/MS (Agilent 1260 Infinity II with a Zorbax Eclipse Plus C18 column, 2.1×50 mm, 1.8-micron attached to an Agilent 6129 quadrupole mass spectrometer).

Biochemical Assays with Fluorogenic Substrate Probes

Each probe was dissolved in DMSO at a proper stock concentration such that the final concentration of DMSO in the sample is 2%. For TBZ1, a two-fold serial dilution was performed to determine the optimal concentration for biochemical assays. Each stock was then diluted in 50 mM tris buffer, pH 7.6 (1 μL stock per 40 μL buffer) and added to a black 96 well plate in triplicate (41 μL per well). Stocks (90 nM in 50 mM tris buffer, pH 7.6) of either iCP or sCP was added to each well (9 μL/well, final concentration=9 nM). The change in fluorescence (Ex—485(20) nm, Em—535(20) nm; gain=50) was monitored over time on a Tecan Infinite 200® Pro Microplate Reader. Data was plotted as the average of triplicate samples using GraphPad Prism 7 and can be found in FIG. 11. Based on this data, 31 μM was chosen for future experiments. This serial dilution assay was repeated using the commercially available iCP-selective probe (Ac-ANW-AMC, Ex—340(20) nm, Em—450(20) nm; gain=50) and this data is shown in FIG. 12. A comparison of TBZ1 to TBZ4 (each at 31 μM) can be seen in FIG. 15.

LC/MS Analysis of TBZ1 Cleavage Products with Purified Proteasomes

In the same way as the biochemical assays (FIG. 11), TBZ1 (31 μM) was incubated at 37° C. with or without purified proteasome (9 nM) in 50 mM tris HCl buffer (pH 7.6) for 55 min in triplicate. After incubation, samples were quenched by adding 50 μL of HPLC-grade acetonitrile. The samples were dried under vacuum then resuspended in 50/50 water/acetonitrile with 0.1% formic acid (100 μL). Samples (50 μL) were analyzed by LC/MS (Agilent 1260 Infinity II with a Zorbax Eclipse Plus C18 column, 2.1×50 mm, 1.8-micron attached to an Agilent 6129 quadrupole mass spectrometer). To determine the amount of cleavage that occurred, the full mass of TBZ1 (1389.0-1390.9) was extracted from each sample, the peak integrated and averaged over triplicate samples. Percent TBZ1 remaining in treated samples was determined by comparing the averages of untreated vs. treated samples.

General Cell Culture

A549 cells (ATCC® CCL-185™) were grown in F-12K medium (Kaughn's Modification of Ham's F-12 Medium, ATCC® 30-2004™) supplemented with 10% fetal bovine serum (FBS) in a humidified 37° C. incubator at 5% $CO_2$. To remove cells from culture flasks, the media was aspirated and the flask was washed with sterile PBS before cells were treated with 0.25% (w/v) Trypsin—0.53 mM EDTA solution. To facilitate dispersal, the flasks were returned to the incubator for 5 min. Trypsin was quenched by adding the supplemented media. The cell suspension was collected and the cells were pelleted (5 min at 1,000×g). After aspirating the media, the cell pellet was resuspended in fresh media. The cell concentration was determined using a hemocytometer and plated accordingly.

Expression of iCP in A549 Cells

Figure 13:
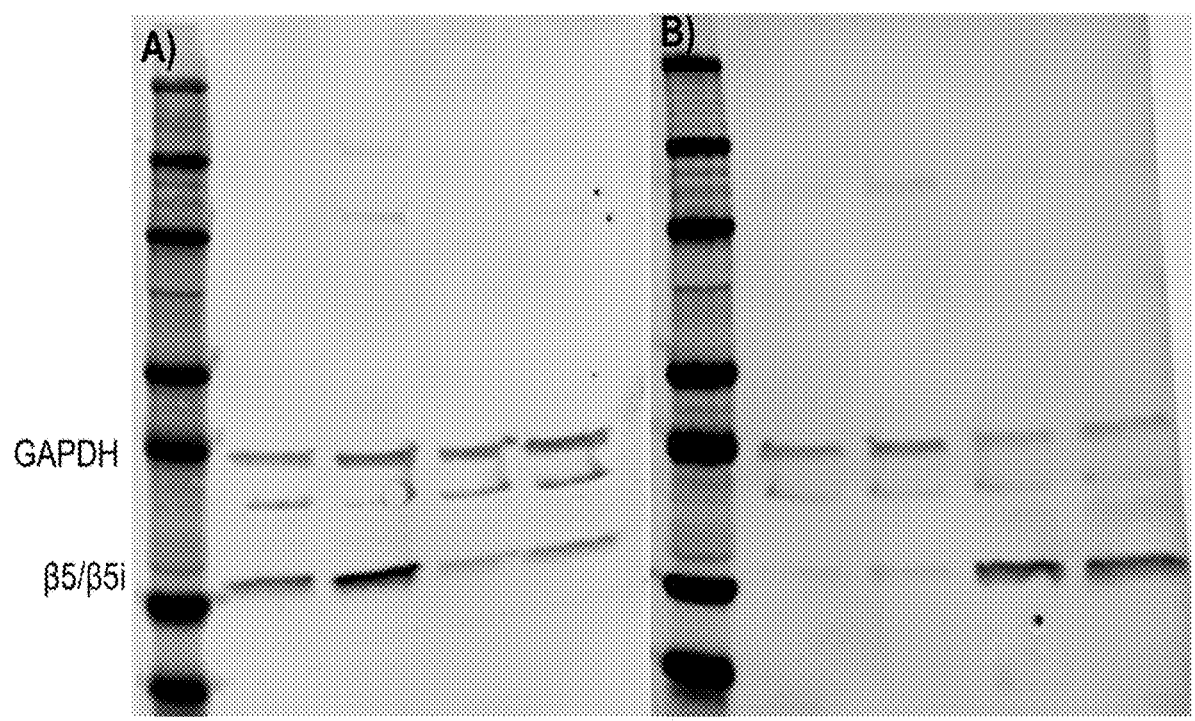
FIG. 13. Western blot analysis of proteasome levels in A549 cells. Blots were stained with anti-GAPDH and A) anti-β5 or B) anti-β5i. Lanes 2 & 3—untreated A549 cells; Lanes 4 & 5—A549 cells treated with IFN-γ (5 ng/mL) for four days.

Cells were treated with 5 ng/mL human recombinant interferon gamma (Biolegend, cat# 713906) each day for four days. At the end of the treatment, cells were collected and lysed with M-PER+HALT protease inhibitor cocktail following the manufacturer's protocol (ThermoScientific). Cells were pelleted (14,000×g, 4° C., 15 min) and the supernatant was transferred to clean tubes. The total protein concentration was measured on a NanoDrop One and normalized for SDS-PAGE and Western blot analysis. Samples were run in duplicate gels to stain for both β5 (PSMB5, Novus Biologicals #NBP2-19983, 1:1000 dilution, host=rabbit) and β5i (PSMB8, Novus Biologicals #NBP1-51957, 1:500 dilution, host=goat) with GAPDH (Novus Biologicals #NB300-221, 1:1000 dilution, host=mouse) as a loading control. Blots were blocked with milk for one hour at room temperature. Primary antibodies in Odyssey® Blocking Buffer (PBS) were stained with at 4° C. overnight. After washing with PBS three times, blots were stained with secondary antibodies (Licor, 1:10,000 dilution in Odyssey® Blocking Buffer (PBS)) at room temperature for 1 hour. Blots were washed again with PBS then imaged on a Licor Odyssey CLx imaging System. Western blots were run on three independent samples. Additional replicates are shown in FIG. 13.

Cellular Assays with TBZ1

A549 cells were treated with 5 ng/mL IFN-γ for 4 days then split into a black 96-well plate at a density of 5,000 cells/well along with non-IFN-γ treated cells. Cells were allowed to adhere overnight before performing assays. The media was removed and fresh media (50 μL) was added to each well. Each probe was added to each well at the corresponding concentration and the plate was returned to the incubator for the given amount of time. To remove any signal due to FBS in the media, the media was removed and cells were washed with PBS (3 times). After the final wash, PBS (50 μL) was added to each well. The plate was incubated at 37° C. in the plate reader, monitoring the change in fluorescence (Ex—485(20) nm, Em—535(20) nm for Rh-probes; gain=90). Samples were run in five replicates and any outliers (outside the range of average±standard deviation) were removed (no more than two replicates per sample were removed). Data was plotted using GraphPad Prism 7 with reported values as an average of samples with error bars shown as the standard deviation. To ensure that observed differences in fluorescence were not due to a difference in total cells or cell viability, a Cell Titer-Glo® luminescent cell viability assay (Promega) was performed in a separate white 96 well plate using the same conditions per the manufacturer's protocol. Luminescence was recorded using a BioTek Synergy™ Neo2 Multimode Microplate Reader. The gain was autoset to samples of media alone and kept the same for later assays. Data plotted in GraphPad Prism 7 can be seen in FIG. 14.

In-Cell Selectivity Assays with TBZ1

For inhibitor studies, ONX-0914 (20 µM) was added with fresh media (50 µL) after cells had adhered overnight. The plate was incubated for 30 min, then the procedure for probe dosing was performed as stated above. Throughout the experiment, the concentration of ONX-0914 was kept constant. Samples were run in five replicates and any outliers (average±standard deviation). Reported values are an average of samples with error bars shown as the standard deviation. To ensure that observed differences in fluorescence were not due to a difference in total cells or cell viability, a Cell Titer-Glo® luminescent cell viability assay (Promega) was performed in a separate white 96 well plate using the same conditions per the manufacturer's protocol. Data plotted in GraphPad Prism 7 can be seen in FIG. 16.

Confocal Imaging with TBZ1

After four days of treatment with IFN-γ, A549 cells were plated into 8-well chambered coverglass plates that had been coated with poly-d-lysine (20,000 cells/well). The cells were allowed to adhere overnight then washed once with PBS. Fresh media including 31 µM TBZ1 was added to wells in triplicate and incubated for one hour. After incubation, the cells were washed with PBS (3 times) then kept in 200 µL modified Krebs-Ringer buffer (134 mM NaCl, 3.5 mM KCl, 1.2 mM $K_2HPO_4 \cdot 3H_2O$, 0.5 mM $MgSO_4 \cdot 7H_2O$, 1.5 mM $CaCl_2 \cdot 2H_2O$, 5 mM $NaHCO_3$ and 10 mM HEPES, pH 7.4). The samples were returned to the incubator. After 30 min, Super Bright 436 HLA-ABC monoclonal antibody (ThermoFisher #62-9983-42) was added to each well (1 µL/well, 0.1 µg) and the samples were returned to the incubator for an additional 30 min. The samples were again washed with PBS and suspended in modified Krebs-Ringer buffer (200 µL) for imaging. Imaging was done using a Nikon Eclipse Ti microscope with an ApoTirf 60X/1.49 oil DIC N2 lens equipped with Nikon Al camera. Visualization of the HLA-ABC antibody was done using a 407 nm laser with filters set for an excitation wavelength of 407 nm and emission wavelength of 450 nm. Visualization of TBZ1 was done using a 488 nm laser with filters set for an excitation wavelength of 488 nm and emission wavelength of 525 nm. Image analysis and coloring was done using ImageJ.

Flow Cytometry Experiments with TBZ1

Figure 17:
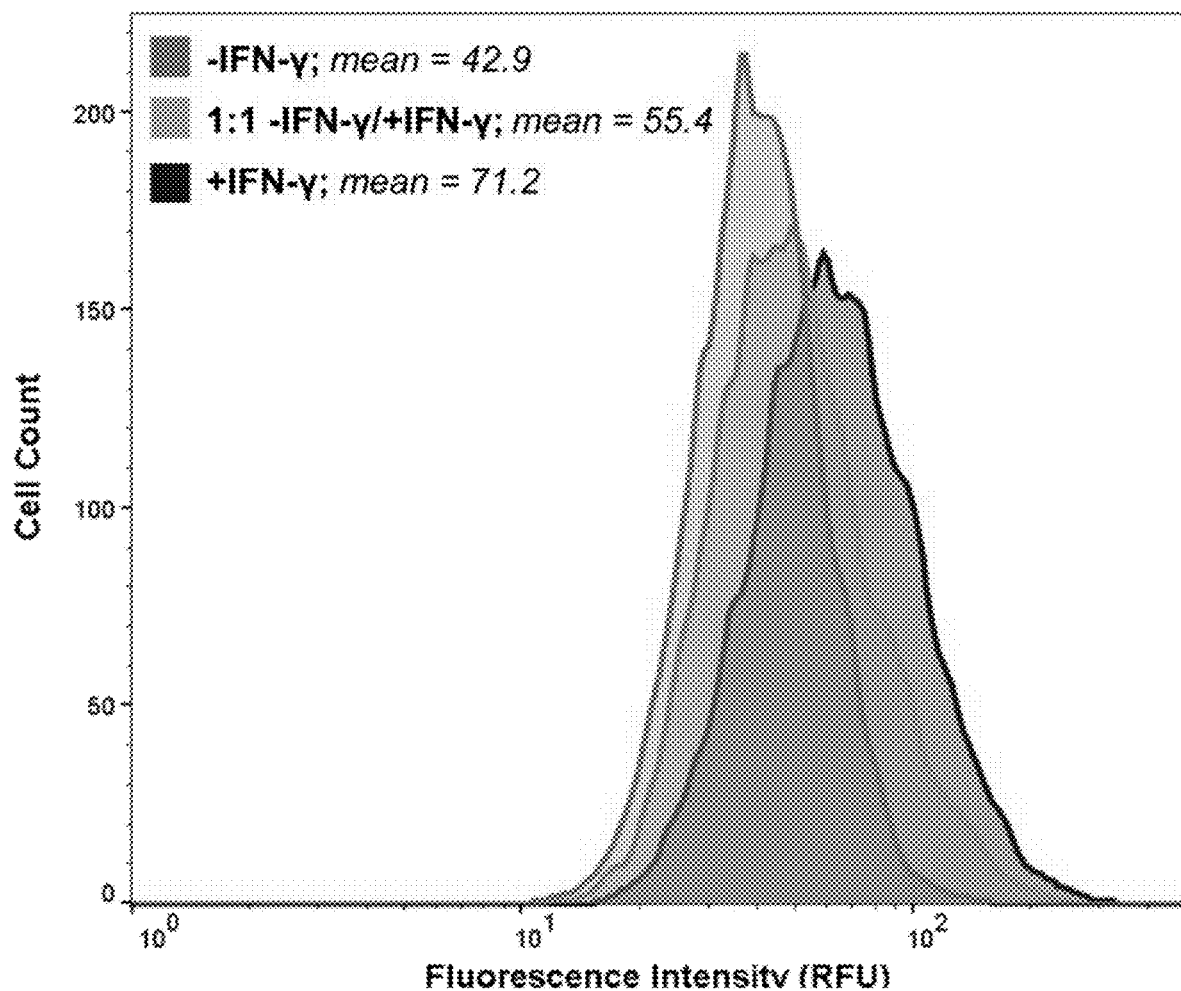
FIG. 17. Flow cytometry analysis of A549 cells dosed with TBZ1 (31 μM).

A549 cells untreated and treated with IFN-γ were each plated into 4 wells of a 12-well plate at 300,000 cells/well. The cells were allowed to adhere overnight. To each well was added fresh media (500 µL) with either DMSO alone or TBZ1 (final concentration=31 µM). The plate was returned to the incubator for an hour. The cells were then washed with PBS (3 times). The plate was incubated for an additional hour in PBS. The cells were removed from each well using trypsin-EDTA solution. After centrifuging and removing the media, the cells were resuspended in PBS. Samples were mixed at a ratio of 1:1 -IFN-γ to +IFN-γ cells then all three samples were analyzed by flow cytometry using a Guava EasyCyte instrument with Guava CytoSoft™ software. Samples were excited with a 488 nm laser and fluorescence intensity was recorded from the 525 nm filter cube. Image analysis was performed using FlowJo v10. Data shown in FIG. 17 is of a single replicate.

Statistical Analysis and Calculation of P-Values

All data was collected in at least triplicate samples. P-values were calculated using a standard t-test (Microscoft Excel) to compare the two populations. Groups with a p-value ≤0.05 were considered to be significantly different, noted in the FIG. captions.

Those skilled in the art will recognize that numerous modifications can be made to the specific implementations described above. The implementations should not be limited to the particular limitations described. Other implementations may be possible.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

It is intended that that the scope of the present methods and compositions be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

REFERENCES (1) Huang, X.; Luan, B.; Wu, J.; Shi, Y. An Atomic Structure of the Human 26S Proteasome. *Nat. Struct. Mol. Biol.* 2016, 23 (9), 778-785.

(2) Coux, O.; Tanaka, K.; Goldberg, A. L. Structure and Functions of the 20S and 26S Proteasomes. *Annu. Rev. Biochem.* 1996, 65 (1), 801-847.

(3) Fabre, B.; Lambour, T.; Delobel, J.; Amalric, F.; Monsarrat, B.; Burlet-Schiltz, O.; Bousquet-Dubouch, M. -P. Subcellular Distribution and Dynamics of Active Proteasome Complexes Unraveled by a Workflow Combining in Vivo Complex Cross-Linking and Quantitative Proteomics. *Mol. Cell. Proteomics* 2013, 12 (3), 687-699.

(4) Coleman, R.; Trader, D. All About the Core: A Therapeutic Strategy to Prevent Protein Accumulation. *ACS Pharmacol Transl Sci* 2018, 1 (2), 140-142.

(5) Opoku-Nsiah, K. A.; Gestwicki, J. E. Aim for the Core: Suitability of the Ubiquitin-Independent 20S Proteasome as a Drug Target in Neurodegeneration. *Transl. Res.* 2018, 198, 48-57.

(6) Aki, M.; Shimbara, N.; Takashina, M.; Akiyama, K.; Kagawa, S.; Tamura, T.; Tanahashi, N.; Yoshimura, T.; Tanaka, K.; Ichihara, A. Interferon-Gamma Induces Different Subunit Organizations and Functional Diversity of Proteasomes. *J. Biochem.* (Tokyo) 1994, 115 (2), 257-269.

(7) Boes, B.; Hengel, H.; Ruppert, T.; Multhaup, G.; Koszinowski, U. H.; Kloetzel, P. -M. Interferon Gamma Stimulation Modulates the Proteolytic Activity and Cleavage Site Preference of 20S Mouse Proteasomes. *J. Exp. Med.* 1994, 179 (3), 901-909.

(8) Nandi, D.; Jiang, H.; Monaco, J. J. Identification of MECL-1 (LMP-10) as the Third IFN-Gamma-Inducible Proteasome Subunit. *J. Immunol.* 1996, 156 (7), 2361-2364.

(9) Groettrup, M.; Kirk, C. J.; Basler, M. Proteasomes in Immune Cells: More than Peptide Producers? *Nat. Rev. Immunol.* 2010, 10 (1), 73-78.

(10) Huber, E. M.; Basler, M.; Schwab, R.; Heinemeyer, W.; Kirk, C. J.; Groettrup, M.; Groll, M. Immuno- and Constitutive Proteasome Crystal Structures Reveal Differences in Substrate and Inhibitor Specificity. *Cell* 2012, 148 (4), 727-738.

(11) Adams, J. Potential for Proteasome Inhibition in the Treatment of Cancer. *Drug Discov. Today* 2003, 8 (7), 307-315.

(12) Deger, J. M.; Gerson, J. E.; Kayed, R. The Interrelationship of Proteasome Impairment and Oligomeric Intermediates in Neurodegeneration. *Aging Cell* 2015, 14 (5), 715-724.

(13) Checler, F.; Alves da Costa, C.; Ancolio, K.; Chevallier, N.; Lopez-Perez, E.; Marambaud, P. Role of the Proteasome in Alzheimer's Disease. *Biochim. Biophys. Acta BBA—Mol. Basis Dis.* 2000, 1502 (1), 133-138.

(14) Liu, C. -W.; Giasson, B. I.; Lewis, K. A.; Lee, V. M.; DeMartino, G. N.; Thomas, P. J. A Precipitating Role for Truncated α-Synuclein and the Proteasome in α-Synuclein Aggregation: IMPLICATIONS FOR PATHOGENESIS OF PARKINSON DISEASE. *J. Biol. Chem.* 2005, 280 (24), 22670-22678.

(15) Liu, H.; Yu, S.; Xu, W.; Xu, J. Enhancement of 26S Proteasome Functionality Connects Oxidative Stress and Vascular Endothelial Inflammatory Response in Diabetes Mellitus. *Arterioscler. Thromb. Vasc. Biol.* 2012, 32 (9), 2131-2140.

(16) Chondrogianni, N.; Tzavelas, C.; Pemberton, A. J.; Nezis, I. P.; Rivett, A. J.; Gonos, E. S. Overexpression of Proteasome β5 Assembled Subunit Increases the Amount of Proteasome and Confers Ameliorated Response to Oxidative Stress and Higher Survival Rates. *J. Biol. Chem.* 2005, 280 (12), 11840-11850.

(17) Almond, J. B.; Cohen, G. M. The Proteasome: A Novel Target for Cancer Chemotherapy. *Leukemia* 2002, 16 (4), 433-443.

(18) Lim, K.-L.; Tan, J. M. Role of the Ubiquitin Proteasome System in Parkinson's Disease. *BMC Biochem.* 2007, 8 (Suppl 1), S13.

(19) Bruggen, P. van der; Eynde, B. J. V. den. Processing and Presentation of Tumor Antigens and Vaccination Strategies. *Curr. Opin. Immunol.* 2006, 18 (1), 98-104.

(20) Vigneron, N.; Van den Eynde, B. J. Proteasome Subtypes and the Processing of Tumor Antigens: Increasing Antigenic Diversity. *Curr. Opin. Immunol.* 2012, 24 (1), 84-91.

(21) Cromm, P. M.; Crews, C. M. The Proteasome in Modern Drug Discovery: Second Life of a Highly Valuable Drug Target. *ACS Cent. Sci.* 2017, 3 (8), 830-838.

(22) Kisselev, A. F.; Goldberg, A. L. Monitoring Activity and Inhibition of 26S Proteasomes with Fluorogenic Peptide Substrates. In *Methods in Enzymology*; Elsevier, 2005; Vol. 398, pp 364-378.

(23) Coleman, R.; Trader, D. Development and Application of a Sensitive Peptide Reporter to Discover 20S Proteasome Stimulators. *ACS Comb Sci* 2018, 20, 269-276.

(24) Urru, S. A. M.; Veglianese, P.; De Luigi, A.; Fumagalli, E.; Erba, E.; Gonella Diaza, R.; Carrà, A.; Davoli, E.; Borsello, T.; Forloni, G.; et al. A New Fluorogenic Peptide Determines Proteasome Activity in Single Cells. *J. Med. Chem.* 2010, 53 (20), 7452-7460.

(25) de Bruin, G.; Xin, B. -T.; Florea, B. I.; Overkleeft, H. S. Proteasome Subunit Selective Activity-Based Probes Report on Proteasome Core Particle Composition in a Native Polyacrylamide Gel Electrophoresis Fluorescence-Resonance Energy Transfer Assay. *J. Am. Chem. Soc.* 2016, 138 (31), 9874-9880.

(26) de Bruin, G.; Xin, B. T.; Kraus, M.; van der Stelt, M.; van der Marel, G. A.; Kisselev, A. F.; Driessen, C.; Florea, B. I.; Overkleeft, H. S. A Set of Activity-Based Probes to Visualize Human (Immuno)Proteasome Activities. *Angew. Chem. Int. Ed.* 2016, 55 (13), 4199-4203.

(27) Sharma, L. K.; Lee, N. -R.; Jang, E. R.; Lei, B.; Zhan, C. -G.; Lee, W.; Kim, K. -B. Activity-Based Near-Infrared Fluorescent Probe for LMP7: A Chemical Proteomics Tool for the Immunoproteasome in Living Cells. *ChemBioChem* 2012, 13 (13), 1899-1903.

(28) Groll, M.; Berkers, C. R.; Ploegh, H. L.; Ovaa, H. Crystal Structure of the Boronic Acid-Based Proteasome Inhibitor Bortezomib in Complex with the Yeast 20S Proteasome. *Structure* 2006, 14 (3), 451-456.

(29) Harshbarger, W.; Miller, C.; Diedrich, C.; Sacchettini, J. Crystal Structure of the Human 20S Proteasome in Complex with Carfilzomib. *Structure* 2015, 23 (2), 418-424.

(30) van der Gracht, A. M. F.; de Geus, M. A. R.; Camps, M. G. M.; Ruckwardt, T. J.; Sarris, A. J. C.; Bremmers, J.; Maurits, E.; Pawlak, J. B.; Posthoorn, M. M.; Bonger, K. M.; et al. Chemical Control over T-Cell Activation in Vivo Using Deprotection of Trans—Cyclooctene-Modified Epitopes. *ACS Chem. Biol.* 2018, 13 (6), 1569-1576.

(31) Koch, C. P.; Perna, A. M.; Pillong, M.; Todoroff, N. K.; Wrede, P.; Folkers, G.; Hiss, J. A.; Schneider, G. Scrutinizing MHC-I Binding Peptides and Their Limits of Variation. *PLOS Comput. Biol.* 2013, 9 (6), e1003088.

(32) Chen, M.; Song, Y.; Fan, Z.; Jiang, P.; Hu, B.; Xue, J.; Wei, H.; Wang, F. Immunogenicity of Different Recombinant Rabbit Hemorrhagic Disease Virus-like Particles Carrying CD8+ T Cell Epitope from Chicken Ovalbumin (OVA). *Virus Res.* 2014, 183, 15-22.

(33) Balyan, R.; Gund, R.; Ebenezer, C.; Khalsa, J. K.; Verghese, D. A.; Krishnamurthy, T.; George, A.; Bal, V.; Rath, S.; Chaudhry, A. Modulation of Naive CD8 T Cell Response Features by Ligand Density, Affinity, and Continued Signaling via Internalized TCRs. *J. Immunol.* 2017, 198 (5), 1823-1837.

(34) Kukutsch, N. A.; Roβner, S.; Austyn, J. M.; Schuler, G.; Lutz, M. B. Formation and Kinetics of MHC Class I-Ovalbumin Peptide Complexes on Immature and Mature Murine Dendritic Cells. *J. Invest. Dermatol.* 2000, 115 (3), 449-453.

(35) Rötzschke, O.; Falk, K.; Stevanovic, S.; Jung, G.; Walden, P.; Rammensee, H. -G. Exact prediction of a natural T cell epitope. *Eur. J. Immunol.* 1991, 21 (11), 2891-2894.

(36) Porgador, A.; Yewdell, J. W.; Deng, Y.; Bennink, J. R.; Germain, R. N. Localization, Quantitation, and In Situ Detection of Specific Peptide—MHC Class I Complexes Using a Monoclonal Antibody. *Immunity* 1997, 6 (6), 715-726.

(37) Cochrane, W. G.; Hackler, A. L.; Cavett, V. J.; Price, A. K.; Paegel, B. M. Integrated, Continuous Emulsion Creamer. *Anal. Chem.* 2017, 89 (24), 13227-13234.

(38) Groettrup, M.; Kraft, R.; Kostka, S.; Standera, S.; Stohwasser, R.; Kloetzel, P. -M. A Third Interferon-γ-Induced Subunit Exchange in the 20S Proteasome. *Eur. J. Immunol.* 1996, 26 (4), 863-869.

(39) Yang, Y.; Waters, J. B.; Früh, K.; Peterson, P. A. Proteasomes Are Regulated by Interferon Gamma: Implications for Antigen Processing. *Proc. Natl. Acad. Sci.* 1992, 89 (11), 4928-4932.

(40) Dechavanne, V.; Vilbois, F.; Glez, L.; Antonsson, B. Purification and Separation of the 20S Immunoproteasome from the Constitutive Proteasome and Identification of the Subunits by LC-MS. *Protein Expr. Purif.* 2013, 87 (2), 100-110.
(41) Kuhn, D. J.; Orlowski, R. Z. The Immunoproteasome as a Target in Hematologic Malignancies. *Semin. Hematol.* 2012, 49 (3) 258-262.
(42) Keller, I. E.; Vosyka, O.; Takenaka, S.; Kloβ, A.; Dahlmann, B.; Willems, L. I.; Verdoes, M.; Overkleeft, H. S.; Marcos, E.; Adnot, S.; et al. Regulation of Immunoproteasome Function in the Lung. *Sci. Rep.* 2015, 5, 10230.
(43) Griffin, T. A.; Nandi, D.; Cruz, M.; Fehling, H. J.; Kaer, L. V.; Monaco, J. J.; Colbert, R. A. Immunoproteasome Assembly: Cooperative Incorporation of Interferon Gamma (IFN-Gamma)-Inducible Subunits. *J. Exp. Med.* 1998, 187 (1), 97-104.
(44) Muchamuel, T.; Basler, M.; Aujay, M. A.; Suzuki, E.; Kalim, K. W.; Lauer, C.; Sylvain, C.; Ring, E. R.; Shields, J.; Jiang, J.; et al. A Selective Inhibitor of the Immunoproteasome Subunit LMP7 Blocks Cytokine Production and Attenuates Progression of Experimental Arthritis. *Nat. Med.* 2009, 15 (7), 781-787.
(45) Beija, M.; Afonso, C. A. M.; Martinho, J. M. G. Synthesis and Applications of Rhodamine Derivatives as Fluorescent Probes. *Chem. Soc. Rev.* 2009, 38 (8), 2410-2433.
(46) Gooch, J.; Abbate, V.; Daniel, B.; Frascione, N. Solid-Phase Synthesis of Rhodamine-110 Fluorogenic Substrates and Their Application in Forensic Analysis. *Analyst* 2016, 141 (8), 2392-2395.

What is claimed is:

1. A compound for delivering a cargo into a living cell comprising a compound (I)

(SEQ ID NO: 1)

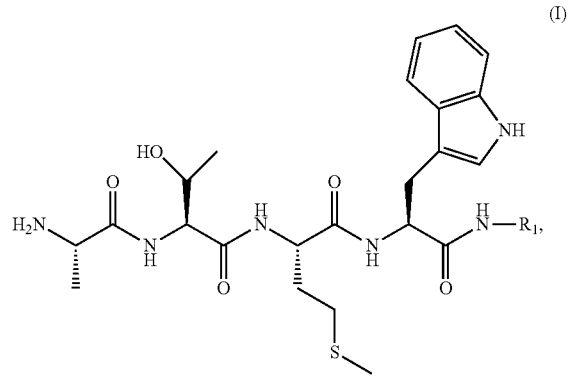

(I)

or a salt thereof, wherein $R_1$ is said cargo to be delivered to said living cell; wherein said cell is producing immunoproteasomes;

wherein said cargo further comprises a moiety connected thereto that helps penetrate said living cell membrane thereby delivering said cargo;

---

SEQUENCE LISTING

```
<160> NUMBER OF SEQ ID NOS: 2

<210> SEQ ID NO 1
<211> LENGTH: 4
<212> TYPE: PRT
<213> ORGANISM: artificial sequence
<220> FEATURE:
<223> OTHER INFORMATION: Lead sequence for delivering a cargo
<220> FEATURE:
<221> NAME/KEY: MOD_RES
<222> LOCATION: (4)..(4)
<223> OTHER INFORMATION: AMIDATION

<400> SEQUENCE: 1

Ala Thr Met Trp
1

<210> SEQ ID NO 2
<211> LENGTH: 4
<212> TYPE: PRT
<213> ORGANISM: artificial sequence
<220> FEATURE:
<223> OTHER INFORMATION: Lead sequence for delivering a cargo with a
      fluorescent probe
<220> FEATURE:
<221> NAME/KEY: MOD_RES
<222> LOCATION: (4)..(4)
<223> OTHER INFORMATION: AMIDATION

<400> SEQUENCE: 2

Ala Thr Met Trp
1
``` and wherein said moiety that penetrates said living cell membrane comprises

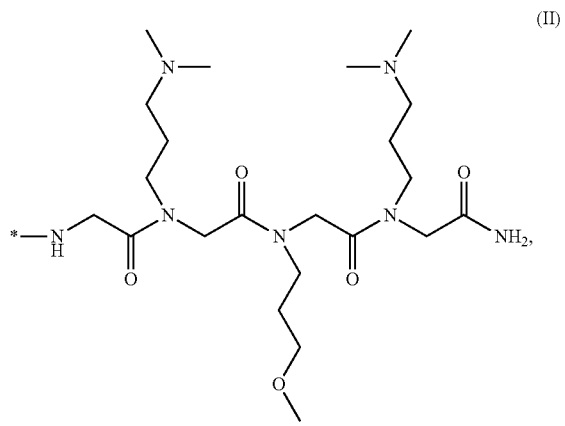 [SMILES: *NCC(=O)N(CCCN(C)C)CC(=O)N(CCCOC)CC(=O)N(CCCN(C)C)CC(N)=O]

(SEQ ID NO: 2)

or a salt thereof, wherein *- denotes the connection point to the cargo.

2. The compound of claim 1, wherein said cargo is an antigenic peptide derived from proteins expressed in cancer cells, a peptide derived from a bacterial or viral protein, a cytotoxic moiety, a label or probe for a method of readout, or a peptide moiety that is recognized by CAR T-cells.

3. The compound of claim 1, wherein said living cell is a cell over producing immunoproteasomes.

4. The compound of claim 3, wherein said cell over producing immunoproteasomes is a diseased cell.

5. The compound of claim 2, wherein said cargo, is a label or probe for a method of readout, and said label or probe is a fluorescent moiety.

6. The compound of claim 5, wherein said compound comprises the following structure:

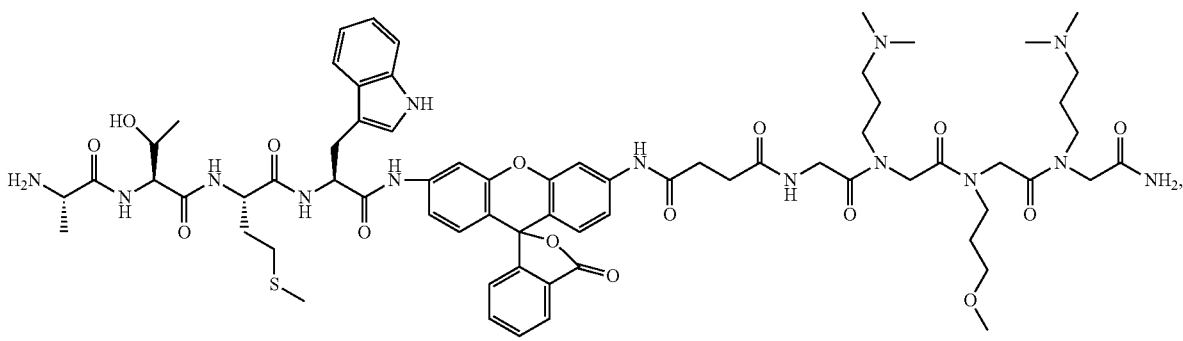

or a salt thereof.

7. A method for monitoring biological activities of an immunoproteasome of a living cell comprising the step of applying an effective amount of the compound of claim 5 to said living cell.

8. The compound of claim 5, wherein said fluorescent moiety is used for monitoring biological activities of an immunoproteasome of a living cell.

9. The compound of claim 8, wherein said immunoproteasome is being overproduced.

10. The compound of claim 8, wherein said living cell over producing immunoproteasomes is a diseased cell.

11. The method of claim 7, wherein said compound has a formula of (SEQ ID NO: 2)

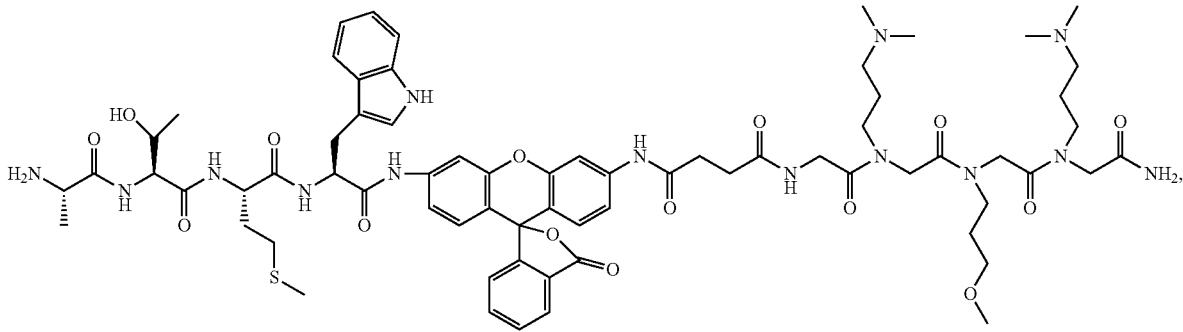

or a salt thereof.

12. The method of claim 7, wherein said living cell is a diseased cell over producing immunoproteasomes.

13. The method according to claim 7, wherein said method is for diagnostic or therapeutic purposes.

* * * * *